(12) United States Patent
Jin et al.

(10) Patent No.: US 11,039,345 B2
(45) Date of Patent: Jun. 15, 2021

(54) INTER-COMMUNICATIONS-SYSTEM MOVING METHOD, DEVICE, AND SYSTEM

(71) Applicant: Huawei Technologies Co., Ltd., Shenzhen (CN)

(72) Inventors: Hui Jin, Beijing (CN); Guowei Ouyang, Beijing (CN); Haorui Yang, Shenzhen (CN); Fenghui Dou, Beijing (CN); Yue He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/495,659

(22) PCT Filed: Aug. 11, 2017

(86) PCT No.: PCT/CN2017/097267
§ 371 (c)(1),
(2) Date: Sep. 19, 2019

(87) PCT Pub. No.: WO2018/171107
PCT Pub. Date: Sep. 27, 2018

(65) Prior Publication Data
US 2020/0068449 A1 Feb. 27, 2020

(30) Foreign Application Priority Data

Mar. 20, 2017 (WO) ................ PCT/CN2017/077387

(51) Int. Cl.
*H04W 36/14* (2009.01)
*H04W 36/18* (2009.01)
(Continued)

(52) U.S. Cl.
CPC ....... *H04W 36/0022* (2013.01); *H04W 4/029* (2018.02); *H04W 36/0016* (2013.01); *H04W 36/08* (2013.01); *H04W 36/18* (2013.01)

(58) Field of Classification Search
None
See application file for complete search history.

(56) References Cited

U.S. PATENT DOCUMENTS 7,570,616 B2    8/2009   Henrikson
9,844,082 B1 * 12/2017   Zhao ................... H04W 76/10
(Continued)

FOREIGN PATENT DOCUMENTS

| CN | 101409901 A | 4/2009 |
|---|---|---|
| CN | 101415175 A | 4/2009 |

(Continued)

OTHER PUBLICATIONS

InterDigital Inc., HTC, 23.501: 5G to EPC Handover without PDU session, 3GPP TSG SA WG2 #122 S2-175161. Jul. 3, 2017. (Year: 2017).*

(Continued)

*Primary Examiner* — Ajit Patel
(74) *Attorney, Agent, or Firm* — Conley Rose, P.C.

(57) ABSTRACT

Embodiments of this application relate to the communications field, and disclose an inter-communications-system moving method, a device, and a system, to implement moving of UE between communications systems and delete a session incapable of being transferred. The inter-communications-system moving method includes: determining, by user equipment UE, whether a first session exists in a first communications system, where the first session is capable of being transferred from the first communications system to a second communications system; and sending, by the UE, a first message to a first core network device of the second communications system when determining that the first session exists, where the first message is used to establish a second session in the second communications system, and the second session corresponds to the first session.

20 Claims, 19 Drawing Sheets

(51) Int. Cl.
*H04W 36/00* (2009.01)
*H04W 36/08* (2009.01)
*H04W 4/029* (2018.01)

(56) References Cited

U.S. PATENT DOCUMENTS

| | | | |
|---|---|---|---|
| 2010/0120427 A1 | 5/2010 | Guo | |
| 2010/0220689 A1 | 9/2010 | Hu et al. | |
| 2011/0182272 A1 | 7/2011 | Santhanam et al. | |
| 2012/0164979 A1* | 6/2012 | Bachmann | H04W 36/0033 455/411 |
| 2012/0182912 A1 | 7/2012 | Watfa et al. | |
| 2013/0003699 A1* | 1/2013 | Liu | H04W 36/0061 370/331 |
| 2013/0301547 A1* | 11/2013 | Gupta | H04L 5/14 370/329 |
| 2013/0308527 A1* | 11/2013 | Chin | H04W 36/0022 370/328 |
| 2014/0051443 A1* | 2/2014 | Diachina | H04W 36/0022 455/436 |
| 2014/0078898 A1* | 3/2014 | Anchan | H04W 36/0044 370/230 |
| 2014/0092870 A1 | 4/2014 | Ulupinar et al. | |
| 2014/0119341 A1 | 5/2014 | Radhakrishnan et al. | |
| 2017/0303169 A1* | 10/2017 | Hampel | H04W 36/0016 |
| 2017/0374704 A1 | 12/2017 | Sharma et al. | |
| 2018/0020386 A1* | 1/2018 | Chandramouli | H04W 36/0027 |
| 2018/0077624 A1* | 3/2018 | Jung | H04W 52/0225 |
| 2018/0115928 A1* | 4/2018 | Kim | H04W 36/0033 |
| 2018/0167854 A1* | 6/2018 | Enomoto | H04W 36/0033 |
| 2018/0192333 A1* | 7/2018 | Wu | H04W 88/10 |
| 2018/0376384 A1 | 12/2018 | Youn et al. | |
| 2018/0376531 A1* | 12/2018 | Martinez Tarradell | H04W 76/27 |
| 2019/0104435 A1* | 4/2019 | Cho | H04W 72/0446 |
| 2019/0150219 A1* | 5/2019 | Wang | H04W 76/30 370/329 |
| 2019/0174377 A1* | 6/2019 | Decarreau | H04W 36/023 |
| 2019/0174573 A1* | 6/2019 | Velev | H04W 76/12 |
| 2019/0306770 A1* | 10/2019 | Vesterinen | H04W 36/12 |
| 2019/0364420 A1* | 11/2019 | Rommer | H04L 63/0485 |
| 2019/0387428 A1* | 12/2019 | Ahmad | H04L 69/08 |
| 2020/0059989 A1* | 2/2020 | Velev | H04W 76/30 |
| 2020/0178048 A1* | 6/2020 | Kim | H04W 8/005 |

FOREIGN PATENT DOCUMENTS

| | | |
|---|---|---|
| CN | 101472312 A | 7/2009 |
| CN | 101641985 A | 2/2010 |
| CN | 102238158 A | 11/2011 |
| CN | 102823297 A | 12/2012 |
| CN | 103379563 A | 10/2013 |
| EP | 2227055 A2 | 9/2010 |
| RU | 2474077 C2 | 1/2013 |
| WO | 2009052726 A1 | 4/2009 |
| WO | 2011134334 A1 | 11/2011 |
| WO | 2012041420 A1 | 4/2012 |
| WO | 2013029245 A1 | 3/2013 |
| WO | 2015160329 A1 | 10/2015 |
| WO | 2016122589 A1 | 8/2016 |
| WO | 2018128529 A1 | 7/2018 |

OTHER PUBLICATIONS

Samsung, Verizon, SK Telecom , Interworking procedure for a dual-registration UE: 5GC to EPC mobility, 3GPP TSG SA WG2 #122 S2-174694. Jun. 20, 2017. (Year: 2017).*
HTC , Clarification to the inter-working procedure with EPC , 3GPP TSG SA WG2 #122 S2-17434. Jun. 20, 2017. (Year: 2017).*
3GPP SA WG2 Meeting #118, S2-166546, Nov. 9, 2016. See chapter 6.18.4 (Year: 2016).*
3GPP SA WG2 Meeting #118bis, S2-170265, Jan. 10, 2017. See chapter 1. (Year: 2017).*
3GPP SA WG2 Meeting #119, S2-171458, Feb. 18, 2017. See chapter 4.3.2.2.1. (Year: 2017).*
3GPP SA WG2 Meeting #118bis, S2-170108, Jan. 10, 2017. See chapter 2, 3. (Year: 2017).*
U.S. Appl. No. 62/444,124, filed Jan. 9, 2017; pp. 1-21.*
Machine Translation and Abstract of Chinese Publication No. CN101409901, Apr. 15, 2009, 12 pages.
NTT Docomo, et al., "23.501: Proposal for NGC-EPC interworking," S2-171607, SA WG2 Meeting #119, Feb. 13-17, 2017, Dubrovnik, Croatia, 2 pages.
Foreign Communication From a Counterpart Application, Chinese Application No. 201780024242.6, Chinese Office Action dated Jan. 6, 2020, 10 pages.
Machine Translation and Abstract of Chinese Publication No. CN102238158, Nov. 9, 2011, 22 pages.
Machine Translation and Abstract of Chinese Publication No. CN103379563, Oct. 30, 2013, 26 pages.
Machine Translation and Abstract of International Publication No. WO2013029245, Mar. 7, 2013, 48 pages.
3GPP TS 23502 V0.2.0, "3rd Generation Partnership Project; Technical Specification Group Services and System Aspects; Procedures for the 5G System; Stage 2(Release 15)," Feb. 2017, 71 pages.
3GPP TS 24.301 V13.9.0, "3rd Generation Partnership Project; Technical Specification Group Core Network and Terminals; Non-Access-Stratum (NAS) protocol for Evolved Packet System (EPS); Stage 3 (Release 13)," Mar. 2017, 468 pages.
3GPP TS 23.401 V14.3.0, "3rd Generation Partnership Project; Technical Specification Group Services and System Aspects; General Packet Radio Service (GPRS) enhancements for Evolved Universal Terrestrial Radio Access Network (E-UTRAN) access (Release 14)," Mar. 2017, 386 pages.
Foreign Communication From a Counterpart Application, PCT Application No. PCT/CN2017/097267, English Translation of International Search Report dated Dec. 27, 2017, 2 pages.
Foreign Communication From a Counterpart Application, PCT Application No. PCT/CN2017/097267, English Translation of Written Opinion dated Dec. 27, 2017, 5 pages.
S2-166546, Qualcomm Incorporated, "On dual attach in EPC and NG Core," SA WG2 Meeting #118, Nov. 14-18, 2016, Reno, NV, USA, 7 pages.
S2-170265, NTT Docomo, "Clarifications to interworking solutions," SA WG2 Meeting #118bis, Jan. 16-20, 2017, Spokane, WA, USA, 8 pages.
Interdigital Inc, et al., "23.501: 5G to EPC Handover without PDU session," S2-175161, SA WG2 Meeting #122, Jun. 26-30, 2017, San Jose Del Cabo, Mexico, 2 pages.
Samsung, et al., "Interworking procedure for a dual-registration UE: 5GC to EPC mobility," S2-174694, SA WG2 Meeting #122, Jun. 26-30, 2017, San Jose del Cabo, Mexico, 4 pages.
HTC, "Clarification to the inter-working procedure with EPC," S2-174346, SA WG2 Meeting #S2-122, Jun. 26-30, 2017, San Jose Del Cabo, Mexico, 3 pages.
S2-174499, China Mobile, "TAU procedure from 5GS to 4G with SR UE using Nx," SA WG2 Meeting #122, Jun. 26-30, 2017, San Jose Del Cabo, Mexico, 3 pages.
S2-174381, InterDigital Inc., "23.501: 5G to EPC Handover without PDU session," SA WG2 Meeting #122, Jun. 26-30, 2017, San Jose Del Cabo, Mexico, 2 pages.
S2-174692, Samsung, "Interworking procedure for a dual-registration UE: EPC to 5GC mobility," SA WG2 Meeting #122, Jun. 26-30, 2017, San Jose del Cabo, Mexico, 11 pages.
S2-170977, Huawei, et al., "PDU session management procedure," SA WG2 Meeting #119, Feb. 13-17, 2017, Dubrovnik, Croatia, 9 pages.

* cited by examiner

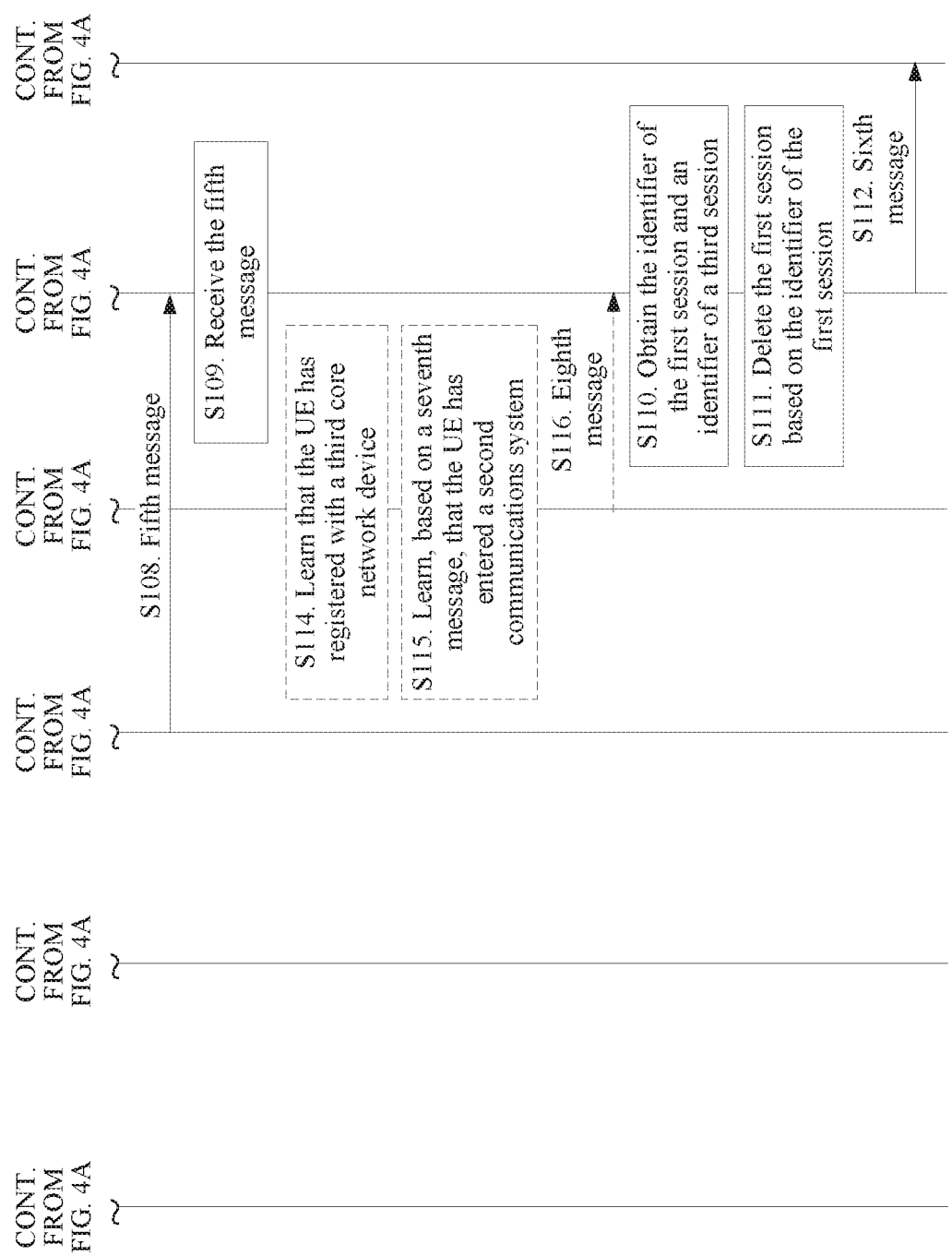

INTER-COMMUNICATIONS-SYSTEM MOVING METHOD, DEVICE, AND SYSTEM

This application is a U.S. National Stage of International Patent Application No. PCT/CN2017/097267 filed on Aug. 11, 2017, which claims priority to International Patent Application No. PCT/CN2017/077387 filed on Mar. 20, 2017. Both of the aforementioned applications are hereby incorporated by reference in their entireties.

TECHNICAL FIELD

This application relates to the communications field, and in particular, to an inter-communications-system moving method, a device, and a system.

BACKGROUND

In latest fifth generation mobile communications technology (5th Generation, 5G) and fourth generation mobile communications technology (4th Generation, 4G) standards of the 3rd Generation Partnership Project (3rd Generation Partnership Project, 3GPP), user equipment (user equipment, UE) can support dual registration (registration with both 5G and 4G).

If the UE seamlessly moves from 5G to 4G in a dual registration state (that is, an Internet Protocol (Internet Protocol, IP) address assigned to the UE does not change, and a connected network element on a core network does not change), protocol data unit (Protocol Data Unit, PDU) sessions (session) established by the UE in 5G are all transferred to 4G by sending, to 4G, an attach message including a handover indication and a PDU connection establishment request message including a handover indication.

However, it is possible that some PDU sessions established in 5G cannot be seamlessly transferred to 4G. During the transfer, a mobility management entity (Mobile Management Entity, MME) may reject a PDN connectivity establishment request because the MME cannot find an address of a PGW based on an access point name (Access Point Name, APN). Consequently, the UE cannot continue to use a service. In addition, during seamless moving of the UE from 5G to a 4G network, after a PDN connection is established in 4G, the PGW is responsible for deleting, from 5G, a PDU session that has been seamlessly transferred, but cannot delete a PDU session that cannot be seamlessly transferred to 4G.

SUMMARY

Embodiments of this application provide an inter-communications-system moving method, a device, and a system, to implement moving of UE between communications systems and delete a session incapable of being transferred.

To achieve the foregoing objective, the following technical solutions are used in the embodiments of this application:

According to a first aspect, an inter-communications-system moving method is provided, where the method includes: determining, by user equipment UE, whether a first session exists in a session established in a first communications system, where the first session is capable of being transferred from the first communications system to a second communications system; and sending, by the UE, a first message to a first core network device of the second communications system when determining that the first session does not exist, where the first message is used to perform attachment attach to the second communications system. According to the inter-communications-system moving method provided in this embodiment of this application, when determining whether the first session exists in the first communications system, the UE sends the first message to the first core network device of the second communications system, to perform attachment to the second communications system. A third core network device obtains an identifier of the first session and an identifier of a third session, where the third session is a session in the first communications system incapable of being transferred from the first communications system to the second communications system. Then, the third core network device deletes the first session based on the identifier of the first session. Because a second session in the second communications system corresponds to the first session in the first communications system, deleting the first session in the first communications system implements transfer of the first session. In addition, a fourth core network device sends a fourth message to a fourth core network device corresponding to an identifier of the second session, so that the fourth core network device deletes the third session corresponding to the identifier of the third session, that is, deletes a session incapable of being transferred. In this way, a session incapable of being transferred is deleted during moving of the UE between communications systems.

In a possible design, that the first message is used to perform attachment to the second communications system includes: the first message is used to perform initial initial attachment to the second communications system. This design provides a specific message for an attach indication.

In a possible design, the sending, by the UE, a first message to a first core network device of the second communications system when determining that the first session does not exist further includes: sending, by the UE, the first message to the first core network device of the second communications system when the UE determines that the first session does not exist and that the UE or the second communications system does not support a specified feature, where the specified feature includes attaching to the second communications system without PDN connectivity. This design provides an implementation for the UE to send a message when the UE determines that the first session does not exist.

In a possible design, the method further includes: sending, by the UE, a second message to the first core network device of the second communications system when the UE determines that the first session exists, where the second message is used to perform tracking area update in the second communications system. This design provides an implementation for the UE to send a message when the UE determines that the first session exists.

In a possible design, the method further includes: sending, by the UE, a third message to the first core network device of the second communications system when the UE determines that the first session exists, where the third message is used to establish a second session in the second communications system, and the second session corresponds to the first session. This design provides a manner of transferring a session between different communications system.

In a possible design, the third message is an attach attach request message, the attach request message includes a handover indication and a ciphered options transfer flag, and the method further includes: receiving, by the UE, a ciphered options request message from the first core network device, where the ciphered options request message is sent by the first core network device based on the ciphered options transfer flag; and sending, by the UE, a ciphered options response message to the first core network device, where the ciphered options response message includes an access point name APN corresponding to the first session. According to this design, a new MME can obtain the access point name APN corresponding to the first session of the UE.

In a possible design, before the sending, by the UE, a third message to the first core network device of the second communications system, the method further includes: determining, by the UE, that the access point name APN corresponding to the first session is not a default APN; or determining, by the UE, that a data network name DNN corresponding to the first session is not a default DNN. This design discloses two conditions of sending an APN by the UE.

In a possible design, the third message is a protocol data network PDN connectivity request, and the PDN connectivity request includes a handover indication and an APN corresponding to the first session. This design discloses content of the PDN connectivity request.

In a possible design, before the sending, by the UE, a third message to the first core network device of the second communications system, the method includes: determining, by the UE, that the APN corresponding to the first session is not a default APN; or determining, by the UE, that a DNN corresponding to the first session is not a default DNN. This design discloses two conditions of sending an APN by the UE.

In a possible design, the method further includes: obtaining, by the UE, the APN based on a locally stored data network name DNN-APN correspondence and the DNN corresponding to the first session. This design discloses a manner of obtaining the DNN corresponding to the first session by the UE.

In a possible design, before the UE determines that the first session exists, the method further includes: sending, by the UE, a PDU session establishment request message to a second core network device of the first communications system, to establish the first session; and receiving, by the UE, a PDU session establishment accept message from the second core network device, where the PDU session establishment accept message includes the APN.

In a possible design, the method further includes: receiving, by the UE, indication information during a process of establishing the first session, where the indication information is used to indicate that the first session is capable of being transferred from the first communications system to the second communications system. This design discloses a manner of obtaining, by the UE, information indicating that the first session is capable of being transferred from the first communications system to the second communications system.

In a possible design, the method further includes: receiving, by the UE, indication information during a process of establishing the first session in the first communications system, where the indication information is used by the UE to determine that the first session is capable of being transferred from the first communications system to the second communications system. This design discloses a manner of obtaining, by the UE, information indicating that the first session is capable of being transferred from the first communications system to the second communications system.

In a possible design, the indication information includes one or a combination of the following information: a parameter related to a session in the second communications system corresponding to the first session, where when the UE receives the related parameter, the UE determines that the first session is capable of being transferred from the first communications system to the second communications system; a service and session continuity mode of the first session, where when the service and session continuity mode of the first session is a specified mode, the UE determines that the first session is capable of being transferred from the first communications system to the second communications system; an IP address of the first session, where when the IP address belongs to a specified address segment, the UE determines that the first session is capable of being transferred from the first communications system to the second communications system; a network slice corresponding to the first session, where when the network slice has a corresponding service in the second communications system, the UE determines that the first session is capable of being transferred from the first communications system to the second communications system; and the data network name corresponding to the first session, where when there is an access point name corresponding to the data network name, the UE determines that the first session is capable of being transferred from the first communications system to the second communications system. This design discloses specific content of the indication information.

In a possible design, the receiving, by the UE, indication information during a process of establishing the first session includes: sending, by the UE, the PDU session establishment request message to the second core network device of the first communications system, to establish the first session; and receiving, by the UE, the PDU session establishment accept message from the second core network device, where the PDU session establishment accept message includes the indication information. This design discloses a manner of obtaining the indication information by the UE.

In a possible design, the ciphered options response message further includes an identifier of a third session, and the third session is a session, of the session in the first communications system, incapable of being transferred from the first communications system to the second communications system. This design discloses a manner of transmitting an identifier of a session incapable of being transferred from the first communications system to the second communications system.

In a possible design, that the first session is capable of being transferred from the first communications system to a second communications system includes: a third core network device serving the first session is a core network device shared by the first communications system and the second communications system, where the third core network device provides a control plane service for the first session; or a third core network device and a fourth core network device that serve the first session are core network devices shared by the first communications system and the second communications system, where the third core network device provides a control plane service for the first session, and the fourth core network device provides a user plane service for the first session. This design discloses specific content about that the first session is capable of being transferred from the first communications system to the second communications system.

In a possible design, that the second session corresponds to the first session includes: the first session and the second session have a same IP address; or the first session and the second session have a same IP address and a same third core network device, where the third core network device provides a control plane service for the first session; or the first session and the second session have a same IP address, a same third core network device, and a same fourth core network device, where the third core network device provides a control plane service for the first session, and the fourth core network device provides a user plane service for the first session. This design discloses specific content about that the second session corresponds to the first session.

In a possible design, the first communications system is a 5G communications system, the second communications system is a 4G communications system, the first session is a PDU session, and the second session is a PDN connection; or the first communications system is a 4G communications system, the second communications system is a 5G communications system, the first session is a PDN connection, and the second session is a PDU session. This design discloses a possible handover direction for the inter-communications-system moving method.

According to a second aspect, an embodiment of this application provides user equipment UE, including: a determining unit, configured to determine whether a first session exists in a session established in a first communications system, where the first session is capable of being transferred from the first communications system to a second communications system; and a sending unit, configured to send, for the UE, a first message to a first core network device of the second communications system when it is determined that the first session does not exist, where the first message is used to perform attachment attach to the second communications system. Based on a same inventive concept, for a problem resolving principle and a beneficial effect of the apparatus, refer to the first aspect, the possible method implementations of the first aspect, and the achieved beneficial effects. Therefore, for implementation of the apparatus, refer to the first aspect and the possible method implementations of the first aspect. Same details are not repeated.

According to a third aspect, an inter-communications-system moving method is provided, where the method includes: determining, by user equipment UE, whether a first session exists in a first communications system, where the first session is capable of being transferred from the first communications system to a second communications system; and sending, by the UE, a first message to a first core network device of the second communications system when determining that the first session exists, where the first message is used to establish a second session in the second communications system, and the second session corresponds to the first session. According to the inter-communications-system moving method provided in this embodiment of this application, when determining whether the first session exists in the first communications system, the UE sends the first message to the first core network device of the second communications system, to establish the second session in the second communications system, where the second session corresponds to the first session. A third core network device obtains an identifier of the first session and an identifier of a third session, where the third session is a session in the first communications system incapable of being transferred from the first communications system to the second communications system. Then, the third core network device deletes the first session based on the identifier of the first session. Because the second session in the second communications system corresponds to the first session, deleting the first session in the first communications system implements transfer of the first session. In addition, a fourth core network device sends a fourth message to a fourth core network device corresponding to an identifier of the second session, so that the fourth core network device deletes the third session corresponding to the identifier of the third session, that is, deletes a session incapable of being transferred. In this way, a session incapable of being transferred is deleted during moving of the UE between communications systems.

In a possible design, the first message is an attach attach request message, the attach request message includes a handover indication and a ciphered options transfer flag, and the method further includes: receiving, by the UE, a ciphered options request message from the first core network device, where the ciphered options request message is sent by the first core network device based on the ciphered options transfer flag; and sending, by the UE, a ciphered options response message to the first core network device, where the ciphered options response message includes an access point name APN corresponding to the first session. According to this design, a new MME can obtain the access point name APN corresponding to the first session of the UE.

In a possible design, before the sending, by the UE, a first message to a first core network device of the second communications system, the method further includes: determining, by the UE, that the access point name APN corresponding to the first session is not a default APN; or determining, by the UE, that a data network name DNN corresponding to the first session is not a default DNN. This design discloses two conditions of sending an APN by the UE.

In a possible design, the first message is a protocol data network PDN connectivity request, and the PDN connectivity request includes a handover indication and an APN corresponding to the first session. This design discloses content of the PDN connectivity request.

In a possible design, before the sending, by the UE, a first message to a first core network device of the second communications system, the method includes: determining, by the UE, that the APN corresponding to the first session is not a default APN; or determining, by the UE, that a DNN corresponding to the first session is not a default DNN. This design discloses two conditions of sending an APN by the UE.

In a possible design, the method further includes: obtaining, by the UE, the APN based on a locally stored data network name DNN-APN correspondence and the DNN corresponding to the first session. This design discloses a manner of obtaining the DNN corresponding to the first session by the UE.

In a possible design, before the determining, by user equipment UE, whether a first session exists in a first communications system, the method further includes: sending, by the UE, a PDU session establishment request message to a second core network device of the first communications system, to establish the first session; and receiving, by the UE, a PDU session establishment accept message from the second core network device, where the PDU session establishment accept message includes the APN. This design discloses a manner of obtaining an APN by the UE.

In a possible design, before the determining, by user equipment UE, whether a first session exists in a first communications system, the method further includes: receiving, by the UE, indication information during a process of establishing the first session, where the indication information is used to indicate that the first session is capable of being transferred from the first communications system to the second communications system. This design discloses a manner of obtaining, by the UE, information indicating that the first session is capable of being transferred from the first communications system to the second communications system.

In a possible design, the indication information includes one or a combination of the following information: a parameter related to a session in the second communications system corresponding to the first session, where when the UE receives the related parameter, the UE determines that the first session is capable of being transferred from the first communications system to the second communications system; a service and session continuity mode of the first session, where when the service and session continuity mode of the first session is a specified mode, the UE determines that the first session is capable of being transferred from the first communications system to the second communications system; an IP address of the first session, where when the IP address belongs to a specified address segment, the UE determines that the first session is capable of being transferred from the first communications system to the second communications system; a network slice corresponding to the first session, where when the network slice has a corresponding service in the second communications system, the UE determines that the first session is capable of being transferred from the first communications system to the second communications system; and the data network name corresponding to the first session, where when there is an access point name corresponding to the data network name, the UE determines that the first session is capable of being transferred from the first communications system to the second communications system. This design discloses specific content of the indication information.

In a possible design, the receiving, by the UE, indication information during a process of establishing the first session includes: sending, by the UE, a PDU session establishment request message to a second core network device of the first communications system, to establish the first session; and receiving, by the UE, a PDU session establishment accept message from the second core network device, where the PDU session establishment accept message includes the indication information. This design discloses a manner of obtaining the indication information by the UE.

In a possible design, the ciphered options response message further includes an identifier of a third session, and the third session is a session, of a session in the first communications system, incapable of being transferred from the first communications system to the second communications system. This design discloses a manner of transmitting an identifier of a session incapable of being transferred from the first communications system to the second communications system.

In a possible design, that the first session is capable of being transferred from the first communications system to a second communications system includes: a third core network device serving the first session is a core network device shared by the first communications system and the second communications system, where the third core network device provides a control plane service for the first session; or a third core network device and a fourth core network device that serve the first session are core network devices shared by the first communications system and the second communications system, where the third core network device provides a control plane service for the first session, and the fourth core network device provides a user plane service for the first session. This design discloses specific content about that the first session is capable of being transferred from the first communications system to the second communications system.

In a possible design, that the second session corresponds to the first session includes: the first session and the second session have a same IP address; or the first session and the second session have a same IP address and a same third core network device, where the third core network device provides a control plane service for the first session; or the first session and the second session have a same IP address, a same third core network device, and a same fourth core network device, where the third core network device provides a control plane service for the first session, and the fourth core network device provides a user plane service for the first session. This design discloses specific content about that the second session corresponds to the first session.

In a possible design, the first communications system is a 5G communications system, the second communications system is a 4G communications system, the first session is a PDU session, and the second session is a PDN connection; or the first communications system is a 4G communications system, the second communications system is a 5G communications system, the first session is a PDN connection, and the second session is a PDU session. This design discloses a possible handover direction for the inter-communications-system moving method.

According to a fourth aspect, an embodiment of this application provides user equipment UE, including: a determining unit, configured to determine whether a first session exists in a first communications system, where the first session is capable of being transferred from the first communications system to a second communications system; and a sending unit, configured to send a first message to a first core network device of the second communications system when it is determined that the first session exists, where the first message is used to establish a second session in the second communications system, and the second session corresponds to the first session. According to the user equipment UE provided in this embodiment of this application, when determining whether the first session exists in the first communications system, the UE sends the first message to the first core network device of the second communications system, to establish the second session in the second communications system, where the second session corresponds to the first session. A third core network device obtains an identifier of the first session and an identifier of a third session, where the third session is a session in the first communications system incapable of being transferred from the first communications system to the second communications system. Then, the third core network device deletes the first session based on the identifier of the first session. Because the second session in the second communications system corresponds to the first session in the first communications system, deleting the first session in the first communications system implements transfer of the first session. In addition, a fourth core network device sends a fourth message to a fourth core network device corresponding to an identifier of the second session, so that the fourth core network device deletes the third session corresponding to the identifier of the third session, that is, deletes a session incapable of being transferred. In this way, a session incapable of being transferred is deleted during moving of the UE between communications systems. Based on a same inventive concept, for a problem resolving principle and a beneficial effect of the apparatus, refer to the third aspect, the possible method implementations of the third aspect, and the achieved beneficial effects. Therefore, for implementation of the apparatus, refer to the third aspect and the possible method implementations of the third aspect. Same details are not repeated.

According to a fifth aspect, an embodiment of this application provides user equipment UE, including a processor, a memory, a bus, and a communications interface, where the memory is configured to store a computer executable instruction, the processor and the memory are connected by using the bus, and when the user equipment UE runs, the processor executes the computer executable instruction stored in the memory, to enable the user equipment UE to perform the method in any one of the first aspect or the possible implementations of the first aspect or the method in any one of the third aspect or the possible implementations of the third aspect. Based on a same inventive concept, the processor invokes the instruction stored in the memory, to implement the solution in the method design in the first aspect. For an implementation of resolving a problem and a beneficial effect of the user equipment UE, refer to the first aspect, the possible method implementations of the first aspect, the third aspect, the possible method implementations of the third aspect, and the beneficial effects thereof. Therefore, for implementation of the user equipment UE, refer to the implementation of the methods. Same details are not repeated.

According to a sixth aspect, an embodiment of this application provides a computer storage medium, including an instruction, where when the instruction is executed on a computer, the computer is enabled to perform the inter-communications-system moving method in the first aspect or the third aspect.

According to a seventh aspect, an embodiment of this application provides a computer program product including an instruction, where when the computer program product runs on a computer, the computer is enabled to perform the inter-communications-system moving method in the first aspect or the third aspect.

In addition, for technical effects brought by any design manner in the fifth aspect to the seventh aspect, refer to the technical effects brought by the design manners in the first aspect or the third aspect. Details are not described herein again.

According to an eighth aspect, an inter-communications-system moving method is provided, including: receiving, by a first core network device, a first message, where the first message is used to establish a second session in a second communications system, the second session corresponds to a first session in a first communications system, and the first session is capable of being transferred from the first communications system to the second communications system; obtaining, by the first core network device, an identifier of the first session; and sending, by the first core network device, a second message to a second core network device, where the second message includes the identifier of the first session, and the second message is used to request the second core network device to delete the first session. According to the inter-communications-system moving method provided in this embodiment of this application, when determining whether the first session exists in the first communications system, UE sends the first message to the first core network device of the second communications system, to establish the second session in the second communications system, where the second session corresponds to the first session. A third core network device obtains the identifier of the first session and an identifier of a third session, where the third session is a session in the first communications system incapable of being transferred from the first communications system to the second communications system. Then, the third core network device deletes the first session based on the identifier of the first session. Because the second session in the second communications system corresponds to the first session in the first communications system, deleting the first session in the first communications system implements transfer of the first session. In addition, a fourth core network device sends a fourth message to a fourth core network device corresponding to an identifier of the second session, so that the fourth core network device deletes the third session corresponding to the identifier of the third session, that is, deletes a session incapable of being transferred. In this way, a session incapable of being transferred is deleted during moving of the UE between communications systems.

In a possible design, the first message is a create session request message, and the create session request message includes a handover indication and an access point name APN corresponding to the first session; and the obtaining, by the first core network device, an identifier of the first session includes: obtaining, by the first core network device, a data network name DNN corresponding to the APN, and an Internet Protocol IP address corresponding to the DNN, or obtaining an Internet Protocol IP address corresponding to the APN; and obtaining, by the first core network device, the identifier of the first session corresponding to the IP address. This design discloses two manners of obtaining the identifier of the first session.

In a possible design, before the receiving, by a first core network device, a first message, the method further includes: sending, by the first core network device, a first request message to a third core network device during a process of establishing the first session for UE, where the first request message includes an address of the first core network device and a DNN corresponding to the first session; or obtaining, by the first core network device, an APN corresponding to the first session during a process of establishing the first session for UE, and sending a first request message to a third core network device, where the first request message includes an address of the first core network device and the APN. This design discloses two types of message content of the first request message.

In a possible design, the first message further includes an identifier of a third session, and the third session is a session, of a session in the first communications system, incapable of being transferred from the first communications system to the second communications system; and the second message further includes the identifier of the third session, and is used to request the second core network device to delete the third session. This design discloses a manner of deleting a session incapable of being transferred from the first communications system to the second communications system.

In a possible design, that the first session is capable of being transferred from the first communications system to the second communications system includes: the first core network device is a core network device shared by the first communications system and the second communications system; or the first core network device is a core network device shared by the first communications system and the second communications system, and a fourth core network device serving the first session is a core network device shared by the first communications system and the second communications system, where the fourth core network device provides a user plane service for the first session. This design discloses specific content about that the first session is capable of being transferred from the first communications system to the second communications system.

In a possible design, that the second session corresponds to a first session in a first communications system includes: the first session and the second session have a same IP address; or the first session and the second session have a same IP address and a same first core network device; or the first session and the second session have a same IP address, a same first core network device, and a same fourth core network device, where the fourth core network device provides a user plane service for the first session. This design discloses specific content about that the second session corresponds to the first session.

In a possible design, the first communications system is a 5G communications system, the second communications system is a 4G communications system, the first session is a PDU session, and the second session is a PDN connection; or the first communications system is a 4G communications system, the second communications system is a 5G communications system, the first session is a PDN connection, and the second session is a PDU session. This design discloses a possible handover direction for the inter-communications-system moving method.

According to a ninth aspect, an embodiment of this application provides a core network device, including: a receiving unit, configured to receive a first message, where the first message is used to establish a second session in a second communications system, the second session corresponds to a first session in a first communications system, and the first session is capable of being transferred from the first communications system to the second communications system; an obtaining unit, configured to obtain an identifier of the first session; and a sending unit, configured to send a second message to a second core network device, where the second message includes the identifier of the first session, and the second message is used to request the second core network device to delete the first session. According to the core network device provided in this embodiment of this application, when determining whether the first session exists in the first communications system, UE sends the first message to a first core network device of the second communications system, to establish the second session in the second communications system, where the second session corresponds to the first session. A third core network device obtains the identifier of the first session and an identifier of a third session, where the third session is a session in the first communications system incapable of being transferred from the first communications system to the second communications system. Then, the third core network device deletes the first session based on the identifier of the first session. Because the second session in the second communications system corresponds to the first session in the first communications system, deleting the first session in the first communications system implements transfer of the first session. In addition, a fourth core network device sends a fourth message to a fourth core network device corresponding to an identifier of the second session, so that the fourth core network device deletes the third session corresponding to the identifier of the third session, that is, deletes a session incapable of being transferred. In this way, a session incapable of being transferred is deleted during moving of the UE between communications systems. Based on a same inventive concept, for a problem resolving principle and a beneficial effect of the apparatus, refer to the eighth aspect, the possible method implementations of the eighth aspect, and the achieved beneficial effects. Therefore, for implementation of the apparatus, refer to the eighth aspect and the possible method implementations of the eighth aspect. Same details are not repeated.

According to a tenth aspect, an embodiment of this application provides a core network device, including a processor, a memory, a bus, and a communications interface, where the memory is configured to store a computer executable instruction, the processor and the memory are connected by using the bus, and when the core network device runs, the processor executes the computer executable instruction stored in the memory, to enable the core network device to perform the method in any one of the eighth aspect or the possible implementations of the eighth aspect. Based on a same inventive concept, the processor invokes the instruction stored in the memory, to implement the solution in the method design in the eighth aspect. For an implementation of resolving a problem and a beneficial effect of the core network device, refer to the eighth aspect, the possible method implementations of the eighth aspect, and the beneficial effects thereof. Therefore, for implementation of the core network device, refer to the implementation of the method. Same details are not repeated.

According to an eleventh aspect, an embodiment of this application provides a computer storage medium, including an instruction, where when the instruction is executed on a computer, the computer is enabled to perform the inter-communications-system moving method in the eighth aspect.

According to a twelfth aspect, an embodiment of this application provides a computer program product including an instruction, where when the computer program product runs on a computer, the computer is enabled to perform the inter-communications-system moving method in the eighth aspect.

In addition, for the technical effects brought by any design manner in the tenth aspect to the twelfth aspect, refer to the technical effects brought by the design manners in the eighth aspect. Details are not described herein again.

According to a thirteen aspect, an inter-communications-system moving method is provided, including: obtaining, by a first core network device, an identifier of a first session and an identifier of a second session, where the first session is a session in a first communications system capable of being transferred from the first communications system to a second communications system, and the second session is a session in the first communications system incapable of being transferred from the first communications system to the second communications system; deleting, by the first core network device, the first session based on the identifier of the first session; and sending, by the first core network device, a first message to a second core network device corresponding to the identifier of the second session, where the first message is used by the second core network device to delete the second session corresponding to the identifier of the second session. According to an inter-communications-system moving method provided in the embodiments of this application, when determining whether a first session exists in a first communications system, UE sends a first message to a first core network device of a second communications system, to establish a second session in the second communications system, where the second session corresponds to the first session. A third core network device obtains an identifier of the first session and an identifier of a third session, where the third session is a session in the first communications system incapable of being transferred from the first communications system to the second communications system. Then, the third core network device deletes the first session based on the identifier of the first session. Because the second session in the second communications system corresponds to the first session in the first communications system, deleting the first session in the first communications system implements transfer of the first session. In addition, a fourth core network device sends a fourth message to a fourth core network device corresponding to an identifier of the second session, so that the fourth core network device deletes the third session corresponding to the identifier of the third session, that is, deletes a session incapable of being transferred. In this way, a session incapable of being transferred is deleted during moving of the UE between communications systems.

In a possible design, the obtaining, by a first core network device, an identifier of a first session and an identifier of a second session includes: receiving, by the first core network device, a second message from a third core network device, where the second message includes the identifier of the first session and the identifier of the second session. This design discloses a manner of obtaining the identifier of the first session and the identifier of the second session.

In a possible design, the obtaining, by a first core network device, an identifier of a first session and an identifier of a second session includes: receiving, by the first core network device, a second message from a third core network device, where the second message includes the identifier of the first session; and obtaining, by the first core network device, the identifier of the second session based on stored session information of the first communications system. This design discloses a manner of obtaining the identifier of the first session and the identifier of the second session.

In a possible design, before the obtaining, by the first core network device, the identifier of the second session based on stored session information of the first communications system, the method further includes: receiving, by the first core network device, a third message from a fourth core network device, and determining, based on the third message, that user equipment UE is currently in the second communications system. This design discloses a manner of learning that the user equipment UE is currently in the second communications system.

In a possible design, before the obtaining, by a first core network device, an identifier of a first session and an identifier of a second session, the method further includes: receiving, by the first core network device, a PDU session establishment request message from user equipment UE, to establish the first session; and sending a PDU session establishment accept message to the UE, where the PDU session establishment accept message includes indication information, and the indication information is used to indicate that the first session is capable of being transferred from the first communications system to the second communications system; or receiving, by the first core network device, a PDU session establishment request message from user equipment UE, to establish the second session; and sending a PDU session establishment accept message to the UE, where the PDU session establishment accept message includes indication information, and the indication information is used to indicate that the second session is incapable of being transferred from the first communications system to the second communications system. This design discloses a manner of notifying the UE whether a session is capable of being transferred from the first communications system to the second communications system.

In a possible design, before the obtaining, by a first core network device, an identifier of a first session and an identifier of a second session, the method further includes: sending, by the first core network device, a third message to a fourth core network device, where the third message includes an address of the second core network device and a DNN corresponding to the first session; or obtaining, by the first core network device, an APN corresponding to the first session, and sending a third message to a fourth core network device, where the third message includes an address of the third core network device and the APN. This design discloses a manner of transmitting the address of the third core network device, the APN, or the DNN.

In a possible design, that the first session is a session in the first communications system capable of being transferred from the first communications system to a second communications system includes: the third core network device serving the first session is a core network device shared by the first communications system and the second communications system, where the third core network device provides a control plane service for the first session; or the third core network device and the fourth core network device that serve the first session are core network devices shared by the first communications system and the second communications system, where the third core network device provides a control plane service for the first session, and the fourth core network device provides a user plane service for the first session. This design discloses specific content about that the first session is capable of being transferred from the first communications system to the second communications system. This design discloses specific content about that the first session is a session in the first communications system capable of being transferred from the first communications system to the second communications system.

In a possible design, the first communications system is a 5G communications system, the second communications system is a 4G communications system, and the first session and the second session are PDU sessions; or the first communications system is a 4G communications system, the second communications system is a 5G communications system, and the first session and the second session are PDN connections. This design discloses a possible handover direction for the inter-communications-system moving method.

According to a fourteenth aspect, an embodiment of this application provides a core network device, including: an obtaining unit, configured to obtain an identifier of a first session and an identifier of a second session, where the first session is a session in a first communications system capable of being transferred from the first communications system to a second communications system, and the second session is a session in the first communications system incapable of being transferred from the first communications system to the second communications system; a deletion unit, configured to delete the first session based on the identifier of the first session; and a sending unit, configured to send a first message to a second core network device corresponding to the identifier of the second session, where the first message is used by the second core network device to delete the second session corresponding to the identifier of the second session. According to a core network device provided in the embodiments of this application, when determining whether a first session exists in a first communications system, UE sends a first message to a first core network device of a second communications system, to establish a second session in a second communications system, where the second session corresponds to the first session. A third core network device obtains an identifier of the first session and an identifier of a third session, where the third session is a session in the first communications system incapable of being transferred from the first communications system to the second communications system. Then, the third core network device deletes the first session based on the identifier of the first session. Because the second session in the second communications system corresponds to the first session in the first communications system, deleting the first session in the first communications system implements transfer of the first session. In addition, a fourth core network device sends a fourth message to a fourth core network device corresponding to an identifier of the second session, so that the fourth core network device deletes the third session corresponding to the identifier of the third session, that is, deletes a session incapable of being transferred. In this way, a session incapable of being transferred is deleted during moving of the UE between communications systems. Based on a same inventive concept, for a problem resolving principle and a beneficial effect of the apparatus, refer to the thirteenth aspect, the possible method implementations of the thirteenth aspect, and the achieved beneficial effects. Therefore, for implementation of the apparatus, refer to the thirteenth aspect and the possible method implementations of the thirteenth aspect. Same details are not repeated.

According to a fifteenth aspect, an embodiment of this application provides a core network device, including a processor, a memory, a bus, and a communications interface, where the memory is configured to store a computer executable instruction, the processor and the memory are connected by using the bus, and when the core network device runs, the processor executes the computer executable instruction stored in the memory, to enable the core network device to perform the method in any one of the thirteenth aspect or the possible implementations of the thirteenth aspect. Based on a same inventive concept, the processor invokes the instruction stored in the memory, to implement the solution in the method design in the eleventh aspect. For an implementation of resolving a problem and a beneficial effect of the core network device, refer to the thirteenth aspect, the possible method implementations of the thirteenth aspect, and the beneficial effects thereof. Therefore, for implementation of the core network device, refer to the implementation of the method. Same details are not repeated.

According to a sixteenth aspect, an embodiment of this application provides a computer storage medium, including an instruction, where when the instruction is executed on a computer, the computer is enabled to perform the inter-communications-system moving method in the thirteenth aspect.

According to a seventeenth aspect, an embodiment of this application provides a computer program product including an instruction, where when the computer program product runs on a computer, the computer is enabled to perform the inter-communications-system moving method in the thirteenth aspect.

In addition, for the technical effects brought by any design manner in the fifteenth aspect to the seventeenth aspect, refer to the technical effects brought by the design manners in the thirteenth aspect. Details are not described herein again.

According to an eighteenth aspect, an inter-communications-system moving method is provided, including: learning, by a first core network device, that user equipment UE has registered with a second core network device of a first communications system; receiving, by the first core network device, a first message sent by a third core network device of a second communications system, and learning, based on the first message, that the UE has entered the second communications system; and sending, by the first core network device, a second message to the second core network device based on that the UE has performed dual registration, where the second message is used to notify the second core network device that the UE has entered the second communications system. According to the inter-communications-system moving method provided in this embodiment of this application, when determining whether a first session exists in the first communications system, the UE sends the first message to the first core network device of the second communications system, to establish a second session in the second communications system, where the second session corresponds to the first session. The third core network device obtains an identifier of the first session and an identifier of a third session, where the third session is a session in the first communications system incapable of being transferred from the first communications system to the second communications system. Then, the third core network device deletes the first session based on the identifier of the first session. Because the second session in the second communications system corresponds to the first session in the first communications system, deleting the first session in the first communications system implements transfer of the first session. In addition, a fourth core network device sends a fourth message to a fourth core network device corresponding to an identifier of the second session, so that the fourth core network device deletes the third session corresponding to the identifier of the third session, that is, deletes a session incapable of being transferred. In this way, a session incapable of being transferred is deleted during moving of the UE between communications systems.

In a possible design, before the sending, by the first core network device, a second message to the first core network device based on that the UE supports dual registration, the method includes: when the UE registers with the first communications system, receiving, by the first core network device, a third message from the second core network device, and learning, based on the third message, that the UE has performed dual registration. This design discloses a manner of learning, by the first core network device, that the UE has performed dual registration.

According to a nineteenth aspect, an embodiment of this application provides a core network device, including: an obtaining unit, configured to learn that user equipment UE has registered with a second core network device of a first communications system; a receiving unit, configured to receive a first message sent by a third core network device of a second communications system, where the obtaining unit is further configured to learn, based on the first message, that the UE has entered the second communications system; and a sending unit, configured to send a second message to the second core network device based on that the UE has performed dual registration, where the second message is used to notify the second core network device that the UE has entered the second communications system. According to the core network device provided in this embodiment of this application, when determining whether a first session exists in the first communications system, the UE sends the first message to a first core network device of the second communications system, to establish a second session in the second communications system, where the second session corresponds to the first session. The third core network device obtains an identifier of the first session and an identifier of a third session, where the third session is a session in the first communications system incapable of being transferred from the first communications system to the second communications system. Then, the third core network device deletes the first session based on the identifier of the first session. Because the second session in the second communications system corresponds to the first session in the first communications system, deleting the first session in the first communications system implements transfer of the first session. In addition, a fourth core network device sends a fourth message to a fourth core network device corresponding to an identifier of the second session, so that the fourth core network device deletes the third session corresponding to the identifier of the third session, that is, deletes a session incapable of being transferred. In this way, a session incapable of being transferred is deleted during moving of the UE between communications systems. Based on a same inventive concept, for a problem resolving principle and a beneficial effect of the apparatus, refer to the eighteenth aspect, the possible method implementations of the eighteenth aspect, and the achieved beneficial effects. Therefore, for implementation of the apparatus, refer to the eighteenth aspect and the possible method implementations of the eighteenth aspect. Same details are not repeated.

According to a twentieth aspect, an embodiment of this application provides a core network device, including a processor, a memory, a bus, and a communications interface, where the memory is configured to store a computer executable instruction, the processor and the memory are connected by using the bus, and when the core network device runs, the processor executes the computer executable instruction stored in the memory, to enable the core network device to perform the method in any one of the eighteenth aspect or the possible implementations of the eighteenth aspect. Based on a same inventive concept, the processor invokes the instruction stored in the memory, to implement the solution in the method design in the sixteenth aspect. For an implementation of resolving a problem and a beneficial effect of the core network device, refer to the eighteenth aspect, the possible method implementations of the eighteenth aspect, and the beneficial effects thereof. Therefore, for implementation of the core network device, refer to the implementation of the method. Same details are not repeated.

According to a twenty-first aspect, an embodiment of this application provides a computer storage medium, including an instruction, where when the instruction is executed on a computer, the computer is enabled to perform the inter-communications-system moving method in the eighteenth aspect.

According to a twenty-second aspect, an embodiment of this application provides a computer program product including an instruction, where when the computer program product runs on a computer, the computer is enabled to perform the inter-communications-system moving method in the eighteenth aspect.

In addition, for the technical effects brought by any design manner in the twentieth aspect to the twenty-second aspect, refer to the technical effects brought by the design manners in the eighteenth aspect. Details are not described herein again.

BRIEF DESCRIPTION OF DRAWINGS

To describe the technical solutions in the embodiments of this application or in the prior art more clearly, the following briefly describes the accompanying drawings required for describing the embodiments or the prior art.

FIG. 4A and FIG. 4B are a schematic flowchart of another inter-communications-system moving method according to an embodiment of this application;

DESCRIPTION OF EMBODIMENTS

The following describes the embodiments of this application with reference to the accompanying drawings.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may understand that with evolution of network architectures and emergence of new service scenarios, the technical solutions provided in the embodiments of this application are also applicable to similar technical problems. It should be noted that the solutions in the embodiments of this application may also be applied to another wireless communications network, and a corresponding name may also be replaced with a name of a corresponding function in the another wireless communications network.

Figure 1:
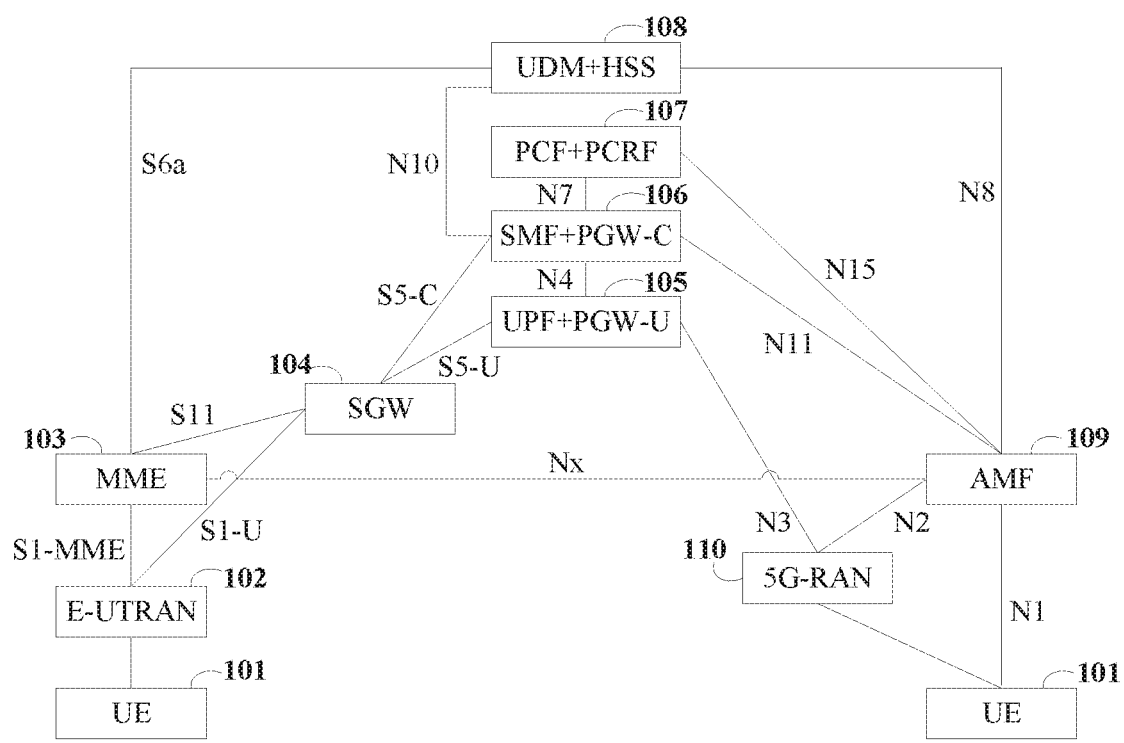
FIG. 1 is a schematic architectural diagram of a communications system according to an embodiment of this application.

FIG. 1 is a schematic diagram of a network architecture of a communications system according to an embodiment of this application, including: UE 101, an evolved UMTS terrestrial radio access network (Evolved UMTS Terrestrial Radio Access Network, E-UTRAN) 102, a mobility management entity (Mobile Management Entity, MME) 103, a serving gateway (Serving Gateway, SGW) 104, a user plane function (User Plane Function, UPF)+PDN gateway-control plane (PDN Gateway-Control plane, PGW-C) 105, a session management function (Session Management Function, SMF)+PDN gateway-user plane (PDN Gateway-User plane, PGW-U) 106, a policy control function (policy control Function, PCF)+policy and charging rules function (Policy and Charging Rules Function, PCRF) unit 107, a home subscriber server (Home Subscriber Server, HSS)+unified data management (Unified Data Management, UDM) 108, an access and mobility management function (Access and Mobility Management Function, AMF) 109, and a 5G radio access network (5G Radio Access Network, 5G-RAN) 110.

The E-UTRAN 102 is a 4G base station, and the UE may access a 4G communications system by using the base station. The 5G-RAN 110 is a 5G base station, and the UE may access a 5G communications system by using the base station. The 5G-RAN may be an evolved E-UTRAN by which the UE may access a base station of the 5G communications system. Alternatively, the 5G-RAN may be a base station specifically used by the UE to access the 5G communications system.

The MME 103 is a 4G core network device, and is responsible for authentication, authorization, mobility management, and session management of the UE. A linked EPS bearer identifier (Linked EPS Bearer ID, LBI) of a protocol data network (protocol data network, PDN) connection (Connection or Connectivity) of the UE in 4G is allocated by the entity.

The SGW 104 is a 4G core network device (core network gateway), and is responsible for data forwarding, downlink data storage, and the like.

The UPF+PGW-U 105 is a core network device shared by 4G and 5G, namely, a core network device integrated for 4G and 5G, and includes functions of a UPF and a PGW-U. The UPF is a user plane device of a 5G core network, provides a user plane service for a PDU session of the UE, and is an interface gateway between an operator network and an external network. The PGW-U is a user plane device of a 4G core network, provides a user plane service for a PDN connection of the UE, and is an interface gateway between an operator network and an external network. The UPF+PGW-U may also be referred to as a PGW-U+UPF, and includes any device that has UPF and PGW-U functions.

The SMF+PGW-C 106 is a core network device shared by 4G and 5G, namely, a core network device integrated for 4G and 5G, and includes functions of an SMF and a PGW-C. The SMF is a control plane device of the 5G core network, provides a control plane service for a PDU session of the UE, manages a PDU session and QoS in 5G, and is responsible for assigning an IP address to the UE and selecting a UPF for the UE. The PGW-C is a control plane device of the 4G core network, provides a user plane service for a PDN connection of the UE, and is responsible for assigning an IP address to the UE and establishing an EPS bearer for the UE. The SMF+PGW-C may also be referred to as a PGW-C+SMF, and includes any device that has SMF and PGW-C functions.

The PCF+PCRF 107 is a core network device shared by 4G and 5G, namely, a core network device integrated for 4G and 5G, and includes a PCF and a PCRF. The PCRF is a 4G core network device, and is responsible for generating a policy used by a user to establish a data bearer (bearer). The PCF is a 5G core network device, and has a function similar to that of the PCRF. The PCF+PCRF may also be referred to as a PCRF+PCF, and includes any device that has PCF and PCRF functions.

The UDM+HSS 108 is a core network device shared by 4G and 5G, namely, a core network device integrated for 4G and 5G, and includes an HSS and a UDM. The HSS is a 4G core network device and is configured to store subscription data of a user. SDM is a 5G core network device and is configured to store subscription data of a user. The UDM+HSS may also be referred to as an HSS+UDM, and includes any device that has HSS and UDM functions.

The AMF 109 is a 5G core network device, and is configured to perform authentication and authorization for a user and manage mobility of the user.

An Nx interface is an interface between the MME 103 and the AMF 109, and currently, this interface is optional. When a network supports the Nx interface, the network instructs the UE to perform single registration (single registration). When the network does not support the Nx interface but the UE supports dual registration, the network instructs the UE to perform dual registration (dual registration). In this embodiment of this application, the single registration means that the UE can register with only one communications system (for example, 4G or 5G) at a time. The dual registration means that the UE can register with two communications systems (for example, 4G and 5G) at the same time, but performs communication by using only one of the communications systems at a specific time, for example, performs communication by using a PDU session established in 5G, or performs communication by using a PDN connection established in 4G.

Figure 2:
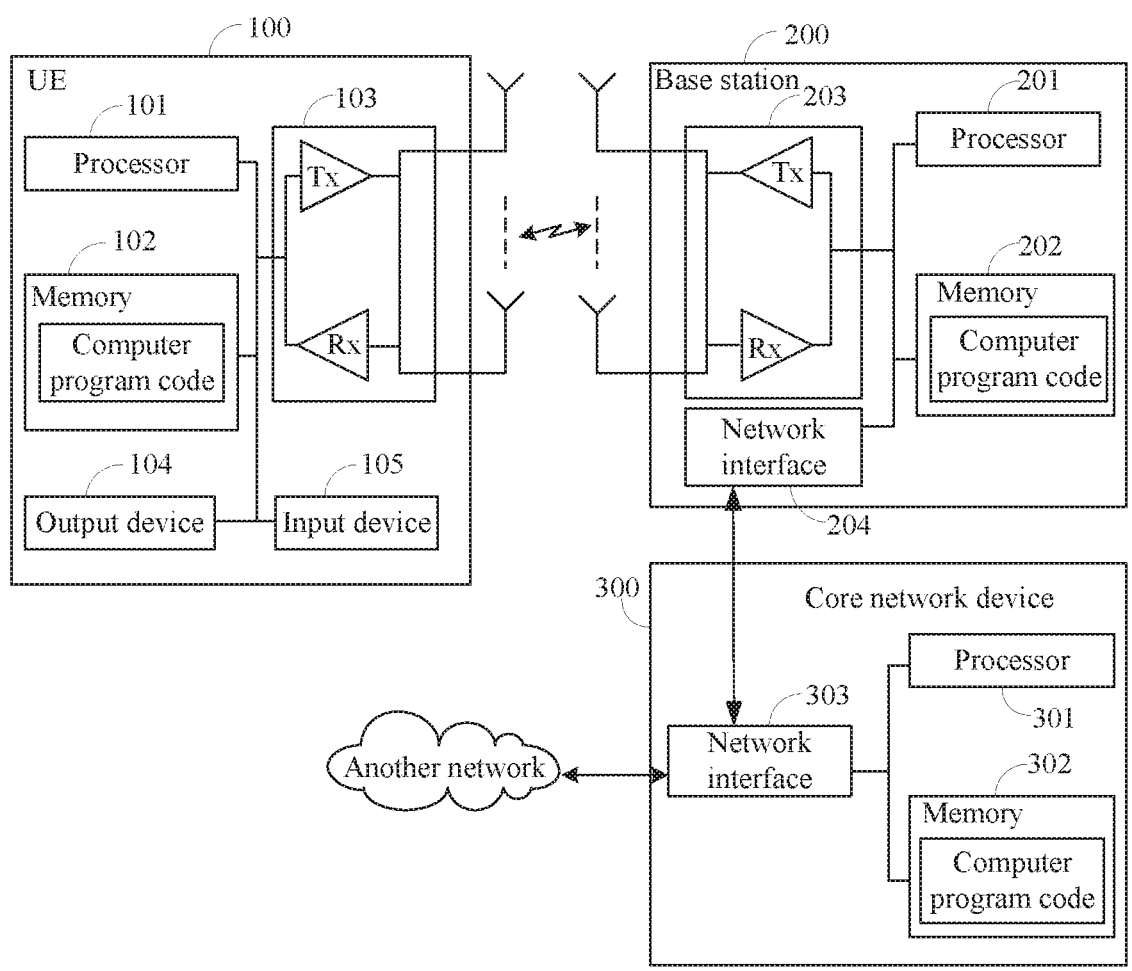
FIG. 2 is a schematic structural diagram of devices of a communications system according to an embodiment of this application.

FIG. 2 is a structural diagram of hardware of devices according to an embodiment of this application. UE 100 includes at least one processor 101, at least one memory 102, and at least one transceiver 103. Optionally, the UE 100 may further include an output device 104 and an input device 105.

The processor 101, the memory 102, and the transceiver 103 are connected by using a bus. The processor 101 may be a general-purpose central processing unit (central processing unit, CPU), a microprocessor, an application-specific integrated circuit (application-specific integrated circuit, ASIC), or one or more integrated circuits configured to control execution of programs of the solutions of this application. The processor 101 may alternatively be a plurality of processors, and each processor may be a single-core (single-CPU) processor or a multi-core (multi-CPU) processor. The processor herein may be one or more devices, circuits, and/or processing cores for processing data (for example, a computer program instruction).

The memory 102 may be a read-only memory (read-only memory, ROM), another type of static storage device that can store static information and an instruction, a random access memory (random access memory, RAM), or another type of dynamic storage device that can store information and an instruction; or may be an electrically erasable programmable read-only memory (electrically erasable programmable read-only memory, EEPROM), a compact disc read-only memory (compact disc read-only memory, CD-ROM) or another optical disk storage, an optical disc storage (including a compact optical disc, a laser disc, an optical disc, a digital versatile disc, a Blu-ray optical disc, or the like), a magnetic disk storage medium or another magnetic storage device, or any other medium that can be used to carry or store expected program code in a form of an instruction or a data structure and that can be accessed by a computer, but is not limited thereto. The memory 102 may exist independently, and is connected to the processor 101 by using the bus. The memory 102 may alternatively be integrated with the processor 101. The memory 102 is configured to store application program code for executing the solutions of this application, and the processor 401 controls execution of the application program code. The processor 401 is configured to execute the computer program code stored in the memory 403, to implement the methods in the embodiments of this application.

The transceiver 103 may be any type of transceiver, and is configured to communicate with another device or a communications network, such as the Ethernet, a radio access network (radio access network, RAN), or a wireless local area network (wireless local area networks, WLAN). The transceiver 103 includes a transmitter Tx and a receiver Rx.

The output device 104 communicates with the processor 401, and may display information in a plurality of manners. For example, the output device 104 may be a liquid crystal display (liquid crystal display, LCD), a light emitting diode (light emitting diode, LED) display device, a cathode ray tube (cathode ray tube, CRT) display device, a projector (projector), or the like. The input device 105 communicates with the processor 101, and may receive user input in a plurality of manners. For example, the input device 105 may be a mouse, a keyboard, a touchscreen device, a sensor device, or the like.

A base station 200 (the E-UTRAN 102 or the 5G-RAN 110) includes at least one processor 201, at least one memory 202, at least one transceiver 203, and at least one network interface 204. The network interface 204 is configured to connect to a network interface 304 of a core network device 300 by using a link (for example, an S1 interface), or connect to a network interface 204 of another base station by using a wired or wireless link (for example, an X2 interface). For functions of components of the base station 200, refer to function descriptions of the components of the UE 100. Details are not described herein again.

The core network device 300 may provide further network connections, for example, connections to a telephone network and/or a data communications network (for example, the Internet). The core network device 300 includes at least one processor 301, at least one memory 302, and at least one network interface 304. For functions of components of the core network device 300, refer to function descriptions of the components of the UE 100. Details are not described herein again.

The inter-communications-system moving method, the device, and the system provided in the embodiments of this application are mainly used for transferring a first session of UE in a first communications system from the first communications system to a second communications system. Essentially, transferring the first session is to create a second session in the second communications system and delete the original first session, where the second session corresponds to the first session. In addition, a third session of the UE incapable of being transferred from the first communications system to the second communications system needs to be deleted from the first communications system.

The first communications system may be a 5G communications system, and the second communications system is a 4G communications system. In this case, the first session is a PDU session, and the second session is a PDN connection. Alternatively, the first communications system is a 4G communications system, the second communications system is a 5G communications system, the first session is a PDN connection, and the second session is a PDU session.

For example, in dual registration mode, when a PDU session established by the UE in 5G can be seamlessly transferred to 4G an AMF selects, for the UE, a network element SMF+PGW-C shared by or integrated for 5G and 4G Therefore, during seamless transfer, an IP address of the session of the UE does not change, and a same network element SMF+PGW-C is used before and after the transfer. Seamlessly transferring the PDU session established by the UE in 5G to 4G is essentially to establish, in 4G, a PDN connection corresponding to the original PDU, and then delete the original PDU session in 5G to achieve the purpose of seamless transfer. It should be noted that the PDU session or the PDN connection described in this embodiment of this application is for single UE and only for the concerned UE, but does not relate to PDU sessions or PDN connections of a plurality of UEs or another UE.

In this embodiment of this application, that the first session is capable of being transferred from the first communications system to the second communications system includes: a first core network device serving the first session is a core network device shared by the first communications system and the second communications system, and a third core network device (for example, an SMF+PGW-C) provides a control plane service for the first session; or both a first core network device and a second core network device that serve the first session are core network devices shared by the first communications system and the second communications system, the first core network device (for example, an SMF+PGW-C) provides a control plane service for the first session, and the second core network device (for example, a UPF+PGW-U) provides a user plane service for the first session.

In this embodiment of this application, that the first session is capable of being transferred from the first communications system to the second communications system may be understood as: The first session supports interworking (Interworking) between the first communications system and the second communications system, or the first session supports interworking (Interworking) from the first communications system to the second communications system, or the core network device SMF+PGW-C serving the first session supports interworking, or the core network devices SMF+PGW-C and UPF+PGW-U that serve the first session support interworking, or the core network device SMF+PGW-C serving the first session is a network element specifically configured for interworking between the first communications system and the second communications system, or the core network devices SMF+PGW-C and UPF+PGW-U that serve the first session are network elements specifically configured for interworking between the first communications system and the second communications system.

In this embodiment of this application, the core network device shared by the first communications system and the second communications system may be understood as: The core network device is a core network device specifically used for interworking (Interworking) between the first communications system and the second communications system.

In this embodiment of this application, that the second session corresponds to the first session may include: the first session and the second session have a same IP address; or the first session and the second session have a same IP address and a same first core network device, and the first core network device (for example, an SMF+PGW-C) provides a control plane service for the first session; or the first session and the second session have a same IP address, a same first core network device, and a same second core network device, the first core network device (for example, an SMF+PGW-C) provides a control plane service for the first session, and the second core network device (for example, a UPF+PGW-U) provides a user plane service for the first session.

This embodiment of this application provides examples of various messages for transmitting information, but is not intended to limit a specific message name. For example, a first message, a second message, or the like may be used to represent a specific message name, or a corresponding message name may be used based on a specific communications system. Similarly, this embodiment of this application provides examples of various core network device names, but is not intended to limit a specific core network device name. For example, a first core network device, a second core network device, or the like may be used to represent a specific core network device, or a corresponding core network device name may be used based on a specific communications system.

Figure 3:
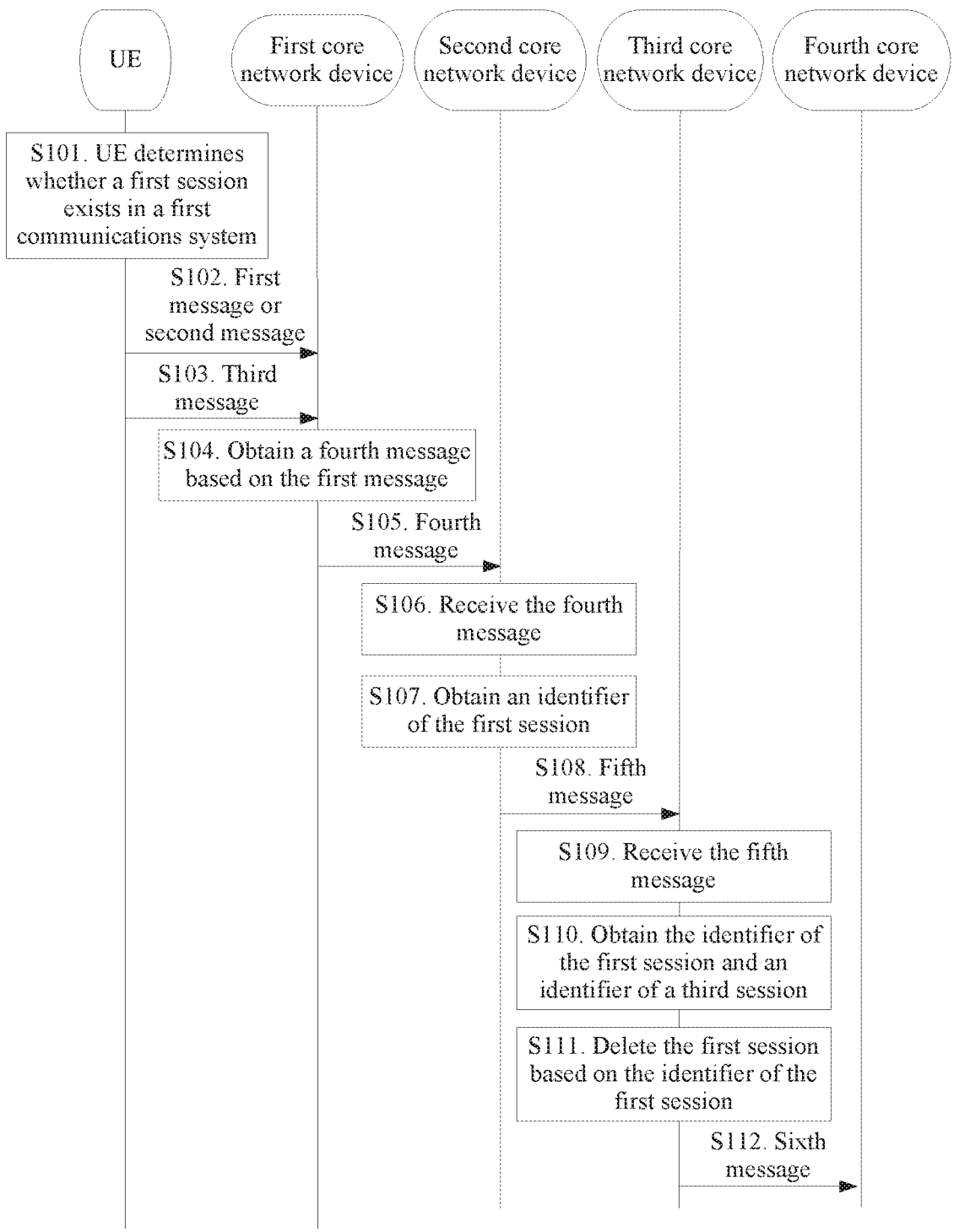
FIG. 3 is a schematic flowchart of an inter-communications-system moving method according to an embodiment of this application.

An embodiment of this application provides an inter-communications-system moving method. As shown in FIG. 3, the method includes the following steps.

S101. UE determines whether a first session exists in a session established in a first communications system, where the first session is capable of being transferred from the first communications system to a second communications system.

S102. The UE sends a first message or a second message to a first core network device of the second communications system when determining that the first session exists, where the first message is used to establish a second session in the second communications system, the second session corresponds to the first session, and the second message is used to perform tracking area update (tracking area update, TAU) in the second communications system.

For example, the first core network device may be an MME, and the first message may be an attach attach request message, a PDN connectivity request, or the like.

It should be noted that the second message may be sent when the UE determines that the first session exists or when another condition is met (for example, the UE does not support dual registration, the UE does not support attach without PDN connectivity (attach without PDN connectivity), or a network does not support attach without PDN connectivity (attach without PDN connectivity).

S103. The UE sends a third message to a first core network device of the second communications system when determining that the first session does not exist, where the third message is used to perform attachment attach to the second communications system.

Specifically, the third message may be used to perform initial (initial) attachment to the second communications system. The initial attachment is an attach message carrying an initial attach indication, or an attach (attach) message carrying an initial request (initial Request) indication in a request type (Request Type) field of the attach (attach) message.

It should be noted that this step may be performed when the UE determines that the first session does not exist or when another condition is met. For example, this step may be performed when the UE determines that the first session does not exist and that the UE or the second communications system does not support a specified feature. The specified feature includes attaching to the second communications system without PDN connectivity (attach without PDN connectivity).

S104. The first core network device receives the first message or the second message or the third message, and obtains a fourth message based on the first message.

The fourth message is used to establish the second session in the second communications system, and the second session corresponds to the first session in the first communications system. The first core network device may also perform a tracking area update procedure based on the second message, or perform an attach procedure based on the third message. Details are not described herein.

S105. The first core network device sends the fourth message to a second core network device.

For example, the second core network device may be an SMF+PGW-C, and the fourth message may be a create session request message.

There may be another core network device, for example, an SGW, between the first core network device and the second core network device.

S106. The second core network device receives the fourth message.

S107. The second core network device obtains an identifier of the first session.

S108. The second core network device sends a fifth message to a third core network device.

The fifth message includes the identifier of the first session, and is used to request the third core network device to delete the first session.

For example, the third core network device may be an AMF, and the fifth message may be a delete session request.

S109. The third core network device receives the fifth message.

S110. The third core network device obtains the identifier of the first session and an identifier of a third session.

The third session is a session in the first communications system incapable of being transferred from the first communications system to the second communications system.

S111. The third core network device deletes the first session based on the identifier of the first session.

For example, the third core network device may be an AMF, and the AMF deletes a correspondence between the identifier of the first session and the second core network device.

S112. The third core network device sends a sixth message to a fourth core network device corresponding to an identifier of the second session, where the sixth message is used by the fourth core network device to delete the third session corresponding to the identifier of the third session.

For example, the fourth core network device may be an SMF, and the sixth message may be a delete session request. The SMF initiates a third-session deletion procedure based on the identifier of the third session in the sixth message.

According to the inter-communications-system moving method provided in this embodiment of this application, when determining that the first session exists in the first communications system, the UE sends the first message to the first core network device of the second communications system, to establish the second session in the second communications system, where the second session corresponds to the first session. The third core network device obtains the identifier of the first session and the identifier of the third session, where the third session is a session in the first communications system incapable of being transferred from the first communications system to the second communications system. Then, the third core network device deletes the first session based on the identifier of the first session. Because the second session in the second communications system corresponds to the first session in the first communications system, deleting the first session in the first communications system implements transfer of the first session. In addition, the fourth core network device sends the sixth message to the fourth core network device corresponding to the identifier of the second session, so that the fourth core network device deletes the third session corresponding to the identifier of the third session, that is, deletes a session incapable of being transferred. In this way, a session incapable of being transferred is deleted during moving of the UE between communications systems.

It should be noted that the foregoing content only shows examples of several possible implementations of indication information, and another implementation of the indication information that can be figured out by a person skilled in the art and a combination of the foregoing implementations should also fall within the protection scope of the embodiments of this application.

Figure 4A:
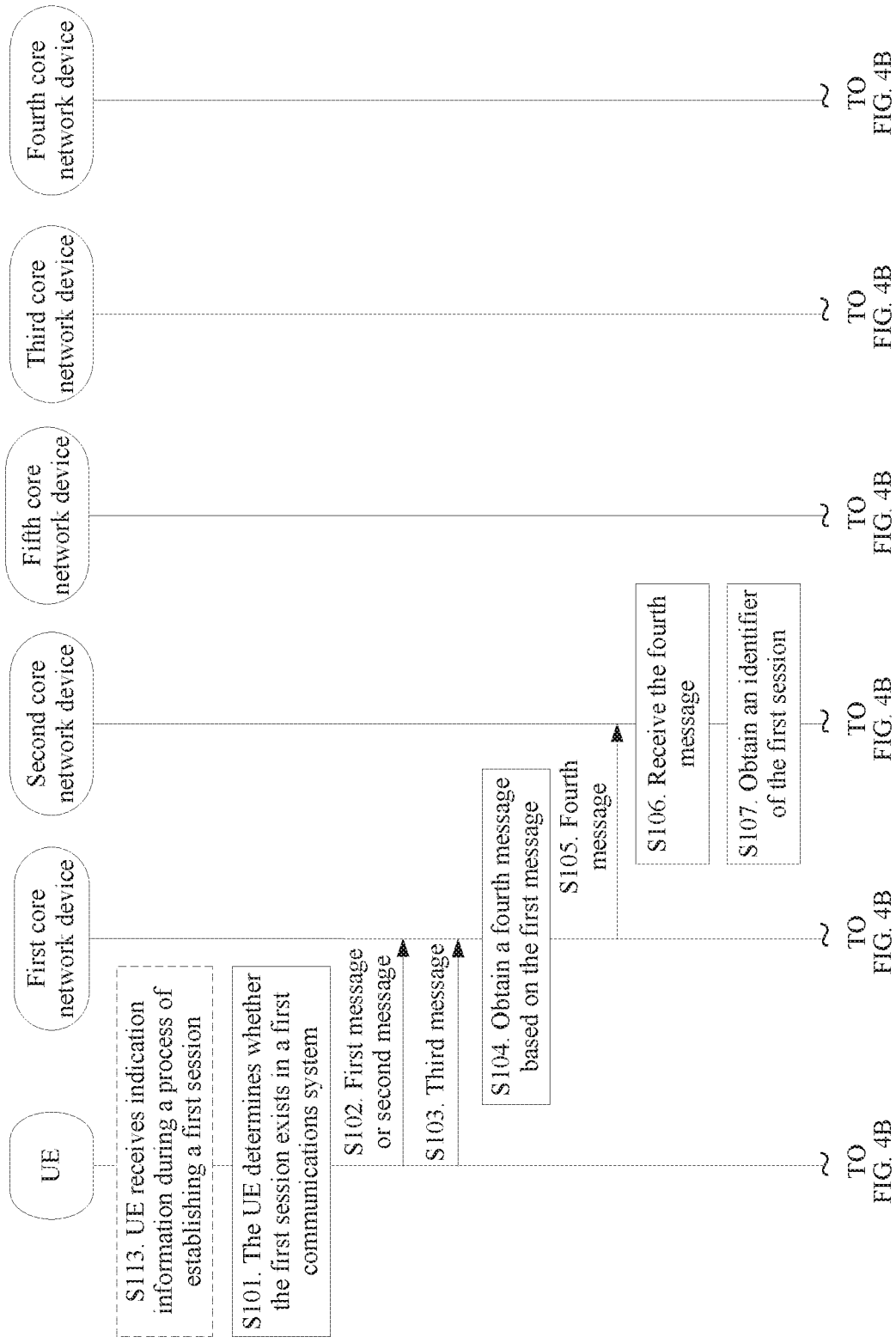

Optionally, referring to FIG. 4A, before step S101, the method further includes the following step:

S113. The UE receives indication information during a process of establishing the first session in the first communications system, where the indication information is used to indicate that the first session is capable of being transferred from the first communications system to the second communications system, or the indication information is used by the UE to determine that the first session is capable of being transferred from the first communications system to the second communications system.

When the indication information is used by the UE to determine that the first session is capable of being transferred from the first communications system to the second communications system, the indication information includes one or a combination of the following information:

A parameter related to a session in the second communications system corresponding to the first session: When the UE receives the parameter related to the session, the UE may determine that the session is capable of being transferred from the first communications system to the second communications system. When the UE does not receive the parameter related to the session, the UE may determine that the session is incapable of being transferred from the first communications system to the second communications system. The parameter related to the session herein includes one or more of a quality of service (Quality of Service, QoS) parameter, a traffic flow template (Traffic Flow Template, TFT), and an enhanced packet system bearer identifier (EPS bearer ID, EBI).

A service and session continuity mode (Service and Session Continuity mode, SSC mode) of the first session: When an SSC mode received by the UE is a specified mode (for example, is 1), the UE may determine that the session is capable of being transferred from the first communications system to the second communications system. When the SSC mode received by the UE is not the specified mode (for example, is 2 or 3), the UE may determine that the session is incapable of being transferred from the first communications system to the second communications system.

An IP address of the first session: When an IP address received by the UE belongs to a specified IP address segment, the UE may determine that the session is capable of being transferred from the first communications system to the second communications system. When the IP address received by the UE does not belong to the specified IP address segment, the UE may determine that the session is incapable of being transferred from the first communications system to the second communications system.

Information about a network slice (Slicing) to which the first session belongs: For example, the information is single network slice selection assistance information (Single Network Slice Selection Assistance Information, S-NSSAI) of the network slice. When the UE determines that a network slice corresponding to the S-NSSAI has a corresponding service service in the second communications system, the UE may determine that the session is capable of being transferred from the first communications system to the second communications system. When the UE determines that the network slice corresponding to the S-NSSAI can be used only in the first communications system, the UE may determine that the session is incapable of being transferred from the first communications system to the second communications system. For example, a mobile broadband (Mobile Broadband, MBB) service can be used in both the first communications system and the second communications system, while a bank-type service with a high security level can be used only in the first communications system and has no corresponding service in the second communications system.

A data network name (Data Network Name, DNN) corresponding to the first session: When there is an access point name (Access Point Name, APN) corresponding to the data network name, the UE may determine that the first session is capable of being transferred from the first communications system to the second communications system. When there isn't an access point name corresponding to the data network name, the UE may determine that the first session is incapable of being transferred from the first communications system to the second communications system.

It should be noted that when the indication information is a combination of a plurality of pieces of information, the UE can determine, only when determining that each piece of the information meets a transfer condition, that the first session is capable of being transferred from the first communications system to the second communications system. In other words, if any piece of the information does not meet the transfer condition, the UE may determine that the first session is incapable of being transferred from the first communications system to the second communications system. For example, if the indication information is a combination of the SSC mode and the DNN, when the SSC mode is a specified mode (for example, is 1), and the DNN has a corresponding APN, the UE may determine that the session is capable of being transferred from the first communications system to the second communications system. For another example, if the indication information is a combination of the SSC mode and the network slice, when the SSC mode is a specified mode (for example, is 1), and the network slice does not have a corresponding service in the second communications system, the UE may determine that the session is incapable of being transferred from the first communications system to the second communications system.

It should be noted that the foregoing content only shows examples of several possible implementations of the indication information, and another implementation of the indication information that can be figured out by a person skilled in the art and a combination of the foregoing implementations should also fall within the protection scope of the embodiments of this application.

Optionally, referring to FIG. 4B, before step S110, the method further includes the following steps:

S114. A fifth core network device learns that the UE has registered with the third core network device of the first communications system.

For example, the fifth core network device may be a UDM+HSS.

S115. The fifth core network device receives a seventh message from the first core network device of the second communications system, and learns, based on the seventh message, that the UE has entered the second communications system. That the UE has entered the second communications system may be understood as: The UE is currently in the second communications system, or the UE has performed registration or location update in the second communications system.

For example, the seventh message may be an update location request.

S116. The fifth core network device sends an eighth message to the third core network device based on that the UE has performed dual registration, where the eighth message is used to notify the third core network device that the UE has entered the second communications system. That the UE has entered the second communications system may be understood as: The UE is currently in the second communications system, or the UE has performed registration or location update in the second communications system.

The following details the inter-communications-system moving method by using an example in which the first communications system is a 5G communications system, the second communications system is a 4G communications system, the first session is a first PDU session, the second session is a PDN connection, and the third session is a second PDU session. It should be noted that a person skilled in the art can understand that the inter-communications-system moving method in this embodiment of this application may also be applied to transfer in a reverse direction. To be specific, the first communications system is 4G the second communications system is 5G, and a PDN connection in 4G is transferred from 4G to 5G.

Specifically, the inter-communications-system moving method provided in this embodiment of this application improves a procedure of UE registration in 5G, a procedure of creating a PDU session in 5G by UE, and a procedure of UE registration in 4G during seamless transfer of a PDU session of UE in 5G from 5G to 4G.

Figure 5:
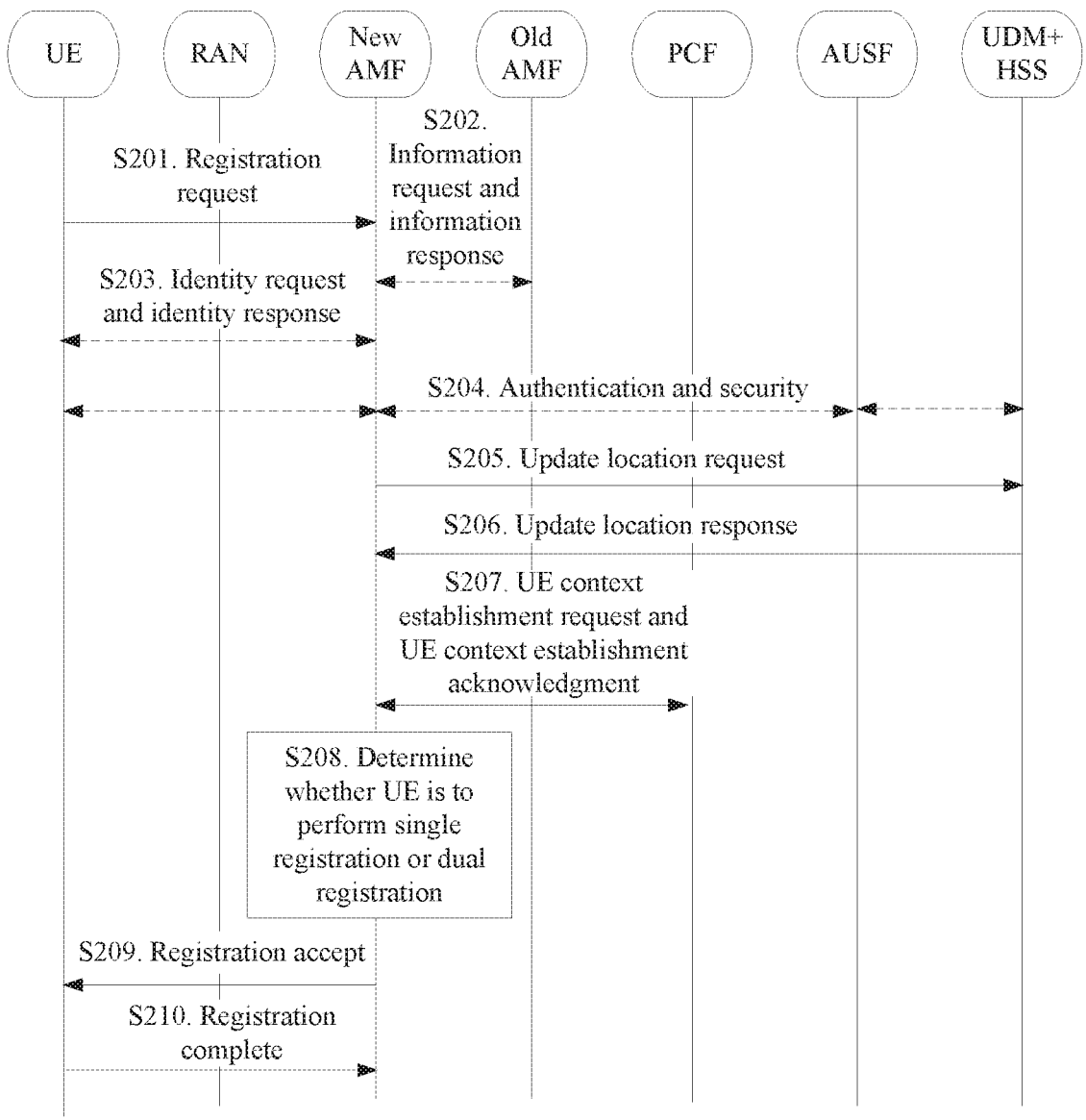
FIG. 5 is a schematic flowchart of UE registration in 5G in the prior art.

In the prior art, a procedure of UE registration in 5G is shown in FIG. 5, and includes the following steps.

S201. UE initiates a registration request (Registration Request) to a new AMF (an AMF currently serving the UE) by using a 5G-RAN, where the registration request includes indication information, and the indication information is used to indicate whether the UE supports dual registration, or the indication information is used to indicate that the UE supports single registration or dual registration.

S202. When the new AMF is different from an old AMF (an AMF serving the UE when the UE performs deregistration (deregistration)), the new AMF requests context information of the UE from the old AMF by using an information request (Information Request) and an information response (Information Response) between the new AMF and the old AMF.

S203. When the new AMF or the old AMF cannot verify validity of the UE, the new AMF requests an international mobile subscriber identity (International Mobile Subscriber Identification Number, IMSI) of the UE from the UE by using an identity request (Identity Request) and an identity response (Identity Response) between the new AMF and the UE.

S204. The new AMF verifies the validity of the UE based on the IMSI by using an authentication (Authentication) message and a security (Security) message.

S205. The new AMF sends an update location request (Update Location Request) to a UDM+HSS, where the update location request includes the identity IMSI of the UE and an identity of the AMF.

The UDM+HSS may learn, based on the update location request, that the UE has registered with the AMF, or the UE has registered with a 5G communications system, or the UE has entered a 5G communications system.

S206. The UDM+HSS returns an update location response (Update Location Response) to the AMF, where the update location response includes subscription data of the UE.

S207. The new AMF requests an operator policy from a PCF by using a UE context establishment request (UE Context Establishment Request) and a UE context establishment acknowledgment (UE Context Establishment Acknowledge).

S208. The new AMF determines whether the UE is to perform single registration or dual registration.

S209. The new AMF sends a registration accept (Registration Accept) message to the UE, where the registration accept message includes registration result (registration result) information, and the registration result information is used to instruct the UE to perform single registration or dual registration.

S210. The UE returns a registration complete (Registration Complete) message to the new AMF.

Steps S202 to S204 are optional, and when the new AMF is the same as the old AMF, steps S202 to S204 are not performed.

Figure 6:
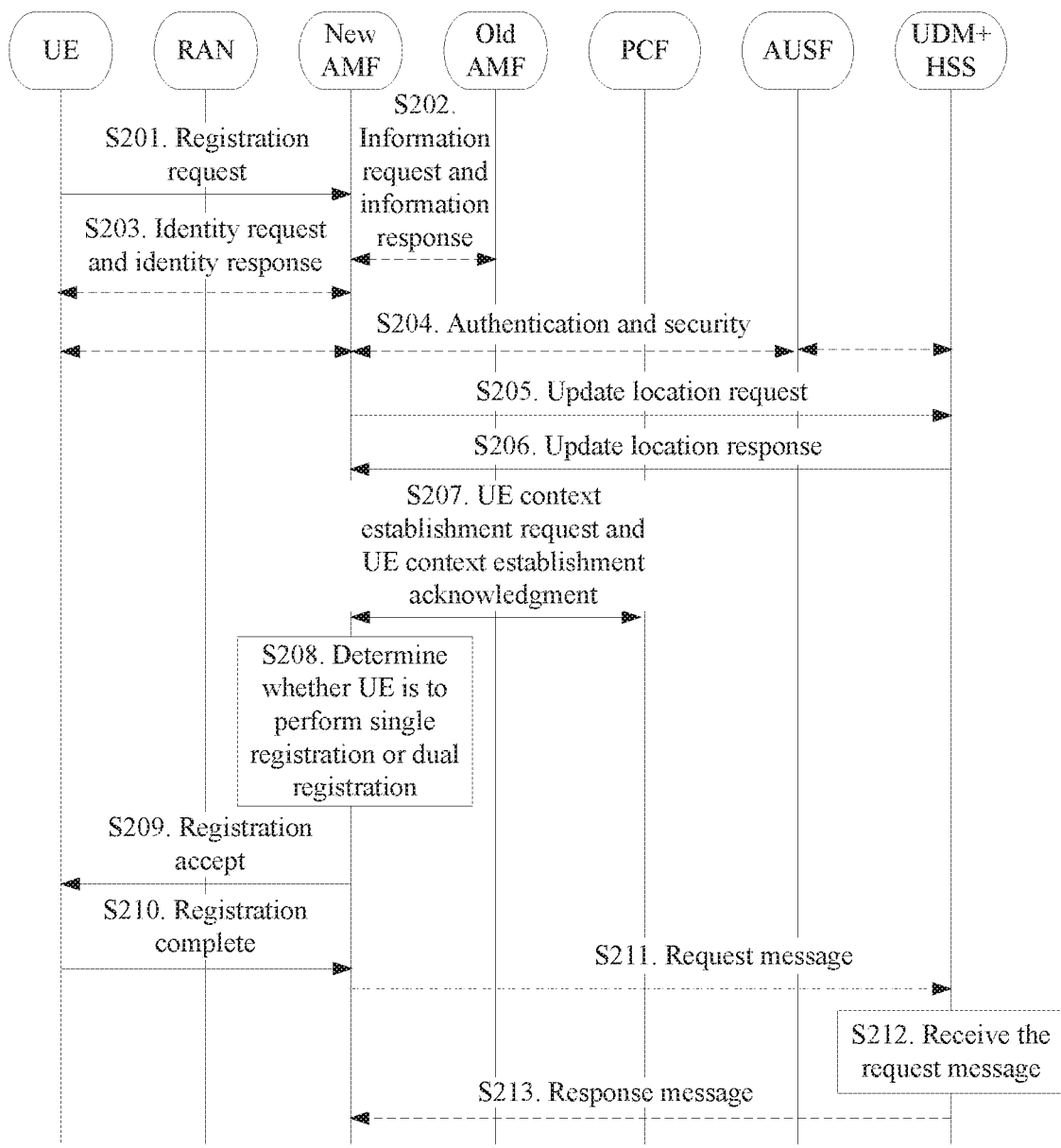
FIG. 6 is a schematic flowchart of UE registration in 5G according to an embodiment of this application.

An embodiment of this application improves the procedure of UE registration in 5G. For details, refer to FIG. 6. The following steps are further included.

S211. If the AMF determines that the UE is to perform dual registration, the AMF sends a request message to the UDM+HSS to notify the AMF that the UE is to perform dual registration, where the request message further includes the identity IMSI of the UE, and the request message may be, for example, a notify request (Notify Request) message.

S212. The UDM+HSS receives the request message.

By using step S212, the UDM+HSS can learn whether the UE is to perform dual registration.

S213. The UDM+HSS returns a response message to the UDM, where the response message may be, for example, a notify response (Notify Response) message.

Figure 7:
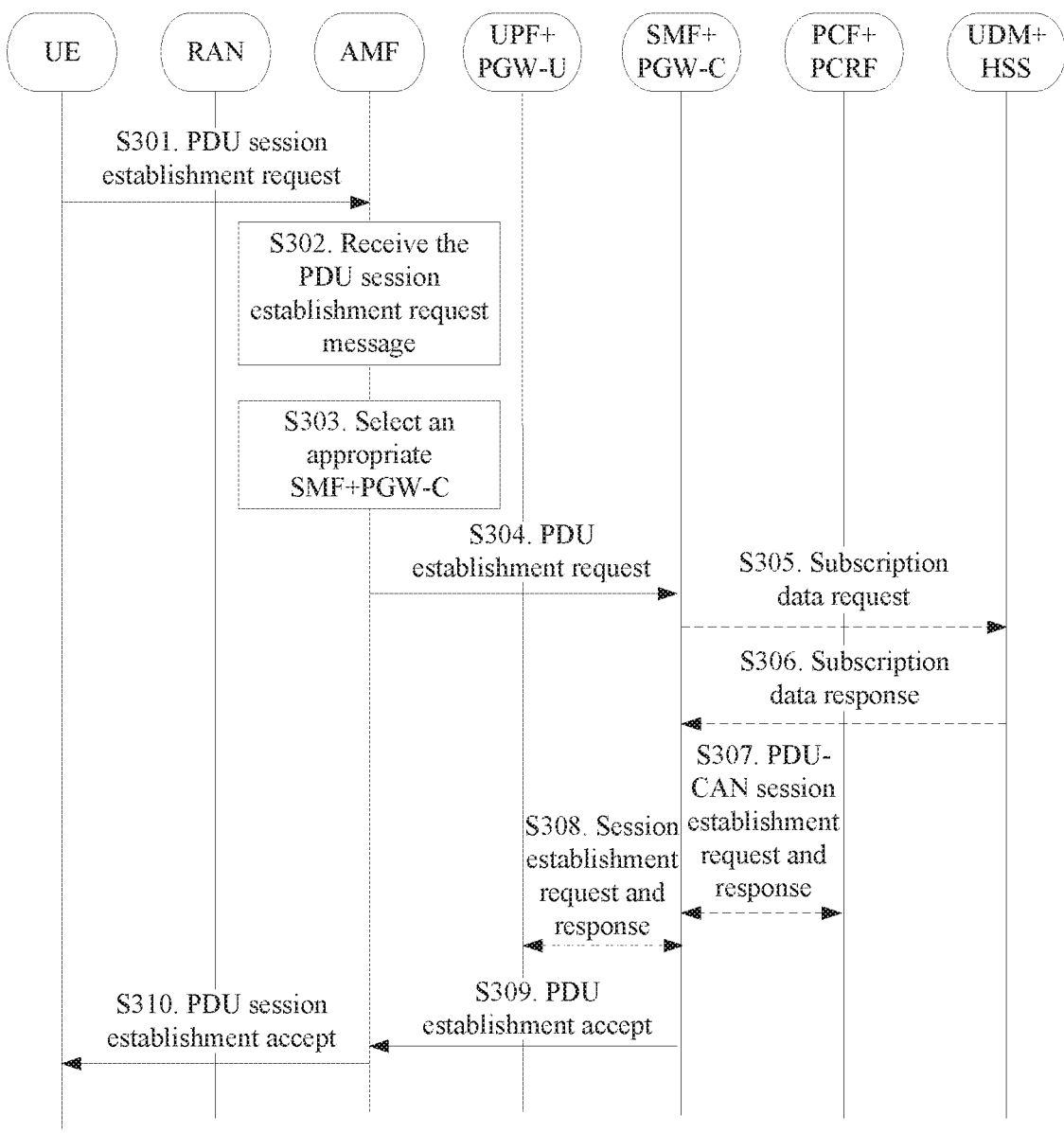
FIG. 7 is a schematic flowchart of PDU session establishment in 5G in the prior art.

In the prior art, a procedure of creating a PDU session in 5G after UE has registered in 5G is shown in FIG. 7, and includes the following steps:

S301. In a 5G communications system, UE initiates a PDU session establishment request (PDU session establishment request) message to an AMF, to request to establish a PDU session in the 5G communications system, where the PDU session establishment request includes single network slice selection assistance information (Single Network Slice Selection Assistance information, S-NSSAI), a data network name (Data Network Name, DNN) corresponding to the PDU session, and a PDU session identifier (PDU session ID).

S302. The AMF receives the PDU session establishment request message.

S303. If the AMF determines, based on the DNN, the S-NSSAI, subscription information, an operator policy (operator policies), and the like, that the PDU session is capable of being transferred to a 4G communications system, the AMF selects a session management function (Session Management Function, SMF) that is shared with the 4G communications system or an appropriate session management function, namely, an SMF+PGW-C.

S304. The AMF sends a PDU establishment request (PDU Establishment Request) to the SMF+PGW-C, to initiate a session management request (SM Request), where the PDU session establishment request includes a permanent identity of the UE, the DNN, the S-NSSAI, the PDU session ID, and an AMF identifier (AMF ID).

S305. When there is no UE subscription data corresponding to the DNN on the SMF+PGW-C, the SMF+PGW-C sends a subscription data request (Subscription Data Request) message to a UDM+HSS to request the subscription data corresponding to the DNN from the UDM+HS S.

S306. The UDM+HSS returns a subscription data response (Subscription data response) message to the SMF+PGW-C, where the subscription data response message includes the subscription data corresponding to the DNN.

S307. When dynamic policy and charging control (Policy and Charging Control, PCC) is used, the SMF+PGW-C requests a corresponding PCC policy from a PCF+PCRF by using a PDU-CAN session establishment request (PDU-CAN Session Establishment Request) message and a PDU-CAN session establishment response (PDU-CAN Session Establishment Response) message.

S308. The SMF+PGW-C initiates a session establishment request to a UPF+PGW-U by using a session establishment request (Session Establishment Request) message and a session establishment response (Session Establishment Response).

S309. The SMF+PGW-C sends a PDU establishment accept (PDU Establishment Accept) message to the AMF, for acknowledgment of the session management request (SM Request ACK).

S310. The AMF sends a PDU session establishment accept (PDU Session Establishment Accept) message to the UE.

Steps S305 to S307 are optional.

Figure 8:
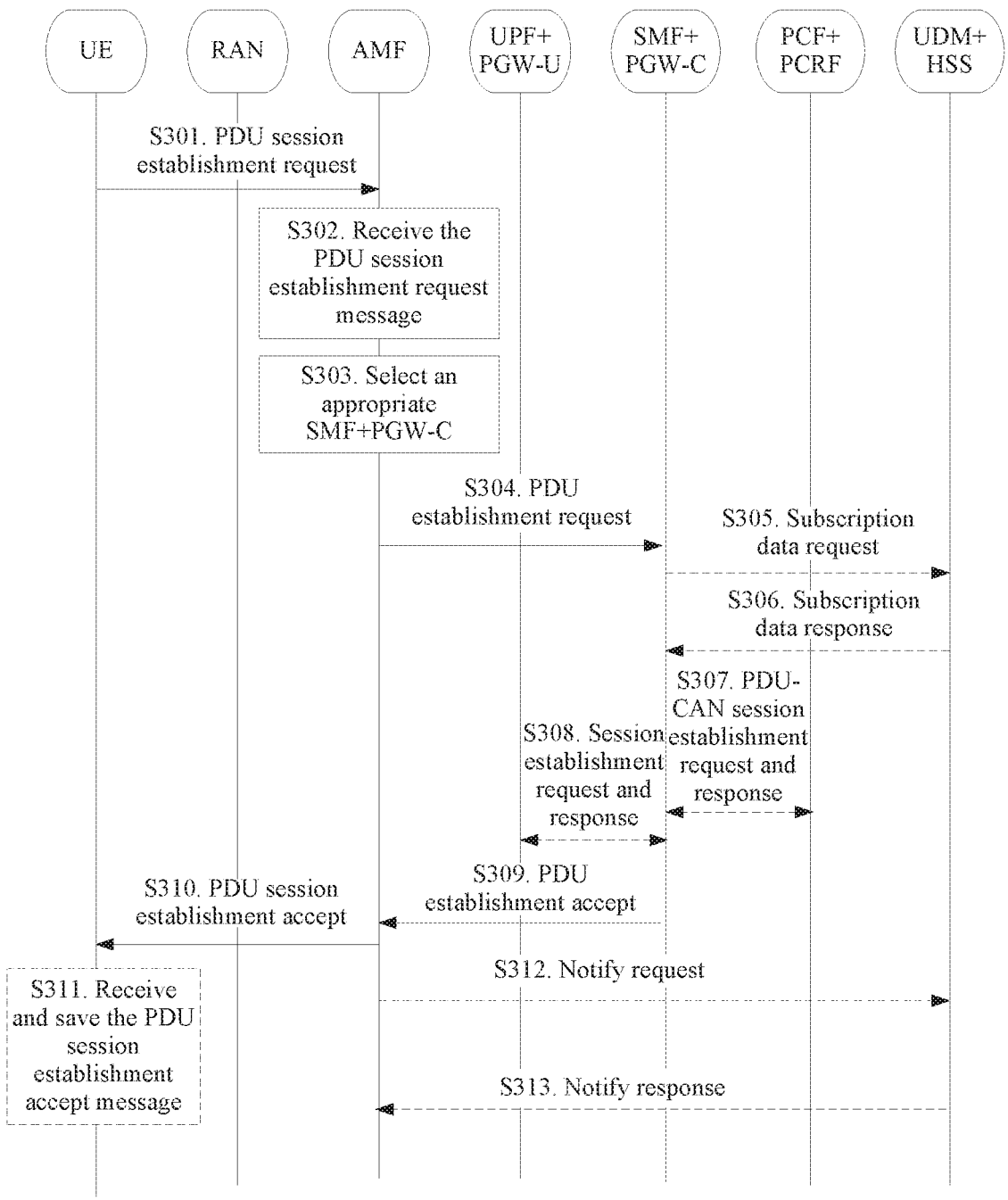
FIG. 8 is a schematic flowchart of PDU session establishment in 5G according to an embodiment of this application.

An embodiment of this application improves the procedure of creating a PDU session in 5G by UE. For details, refer to FIG. 8. The following steps are included.

For step S310, the PDU session establishment accept message includes indication information, where the indication information indicates whether an established PDU session is capable of being transferred from the first communications system (for example, 5G) to the second communications system (for example, 4G), and the AMF saves information about whether the PDU session is capable of being transferred from the first communications system to the second communications system.

Alternatively, the indication information is used by the UE to determine that a first session is capable of being transferred from the first communications system to the second communications system, and the indication information includes one or a combination of the following information:

A parameter related to a session in the second communications system corresponding to the first session: When the UE receives the parameter related to the session, the UE may determine that the session is capable of being transferred from the first communications system to the second communications system. When the UE does not receive the parameter related to the session, the UE may determine that the session is incapable of being transferred from the first communications system to the second communications system. The parameter related to the session herein includes one or more of a quality of service (Quality of Service, QoS) parameter, a traffic flow template (Traffic Flow Template, TFT), and an enhanced packet system bearer identifier (EPS bearer ID, EBI).

A service and session continuity mode (Service and Session Continuity mode, SSC mode) of the first session: When an SSC mode received by the UE is a specified mode (for example, is 1), the UE may determine that the session is capable of being transferred from the first communications system to the second communications system. When the SSC mode received by the UE is not the specified mode (for example, is 2 or 3), the UE may determine that the session is incapable of being transferred from the first communications system to the second communications system.

An IP address of the first session: When an IP address received by the UE belongs to a specified IP address segment, the UE may determine that the session is capable of being transferred from the first communications system to the second communications system. When the IP address received by the UE does not belong to the specified IP address segment, the UE may determine that the session is incapable of being transferred from the first communications system to the second communications system.

Information about a network slice (Slicing) to which the first session belongs: For example, the information is single network slice selection assistance information (Single Network Slice Selection Assistance Information, S-NSSAI) of the network slice. When the UE determines that a network slice corresponding to the S-NSSAI has a corresponding service service in the second communications system, the UE may determine that the session is capable of being transferred from the first communications system to the second communications system. When the UE determines that the network slice corresponding to the S-NSSAI can be used only in the first communications system, the UE may determine that the session is incapable of being transferred from the first communications system to the second communications system. For example, a mobile broadband (Mobile Broadband, MBB) service can be used in both the first communications system and the second communications system, while a bank-type service with a high security level can be used only in the first communications system and has no corresponding service in the second communications system.

A data network name (Data Network Name, DNN) corresponding to the first session: When there is an access point name (Access Point Name, APN) corresponding to the data network name, the UE may determine that the first session is capable of being transferred from the first communications system to the second communications system. When there isn't an access point name corresponding to the data network name, the UE may determine that the first session is incapable of being transferred from the first communications system to the second communications system.

It should be noted that when the indication information is a combination of a plurality of pieces of information, the UE can determine, only when determining that each piece of the information meets a transfer condition, that the first session is capable of being transferred from the first communications system to the second communications system. In other words, if any piece of the information does not meet the transfer condition, the UE may determine that the first session is incapable of being transferred from the first communications system to the second communications system. For example, if the indication information is a combination of the SSC mode and the DNN, when the SSC mode is a specified mode (for example, is 1), and the DNN has a corresponding APN, the UE may determine that the session is capable of being transferred from the first communications system to the second communications system. For another example, if the indication information is a combination of the SSC mode and the network slice, when the SSC mode is a specified mode (for example, is 1), and the network slice does not have a corresponding service in the second communications system, the UE may determine that the session is incapable of being transferred from the first communications system to the second communications system.

It should be noted that the foregoing content only shows examples of several possible implementations of the indication information, and another implementation of the indication information that can be figured out by a person skilled in the art and a combination of the foregoing implementations should also fall within the protection scope of the embodiments of this application.

Specifically, the established PDU session is classified into a first PDU session and a second PDU session. The first PDU session is a PDU session capable of being transferred from the first communications system (for example, 5G) to the second communications system (for example, 4G), or a PDU session that supports interworking (Interworking). The first PDU session is not limited to one PDU session and may include a plurality of PDU sessions. Different from the first PDU session, the second PDU session is a PDU session incapable of being transferred from the first communications system (for example, 5G) to the second communications system (for example, 4G), or a PDU session that does not support interworking. Similarly, the second PDU session is not limited to one PDU session and may include a plurality of PDU sessions.

This design allows the UE to learn whether the established PDU session is capable of being transferred from the first communications system (for example, 5G) to the second communications system (for example, 4G).

Optionally, the AMF maps a DNN corresponding to the first PDU session to an APN corresponding to the first PDU session. Therefore, the PDU session establishment accept message may further include the mapped-to APN, so that the UE can obtain the APN corresponding to the established first PDU session.

S311. The UE receives the PDU session establishment accept message, learns, based on the indication information, whether the PDU session is capable of being transferred from the first communications system to the second communications system, and saves the PDU session establishment accept message.

In other words, the UE may learn whether a session corresponding to the PDU session identifier (PDU Session ID) is capable of being transferred from the first communications system (for example, 5G) to the second communications system (for example, 4G).

The indication information may indicate, by using different values, for example, true (true)/false (false), whether the PDU session is capable of being transferred from the first communications system to the second communications system. Alternatively, presence of the indication information indicates whether the PDU session is capable of being transferred from the first communications system to the second communications system. For example, the indication information is carried in a PDU session establishment accept message for a PDU session capable of being transferred from the first communications system to the second communications system; and the indication information is not carried in a PDU session establishment accept message for a PDU session incapable of being transferred from the first communications system to the second communications system. Alternatively, the indication information is used by the UE to determine that the first session is capable of being transferred from the first communications system to the second communications system. The indication information includes one or a combination of the following information: a parameter related to a session in the second communications system corresponding to the first session, an SSC mode of the first session, an IP address of the first session, information about a network slice slicing to which the first session belongs, and a data network name corresponding to the first session.

S312. When the AMF determines that the PDU session is capable of being transferred from the first communications system to the second communications system, the AMF sends a notify request (Notify Request) message to the UDM+HSS.

The notify request message may include the DNN corresponding to the first PDU session and an SMF+PGW-C address corresponding to the first PDU, or may include the APN corresponding to the first PDU session and an SMF+PGW-C address corresponding to the first PDU session.

The DNN corresponding to the first PDU session may be understood as a DNN used by the first PDU session. The APN corresponding to the first PDU session may be understood as an APN corresponding to the DNN. The SMF+PGW-C address corresponding to the first PDU session may be understood as an SMF+PGW-C address used by the first PDU session.

If the notify request message includes the APN corresponding to the first PDU session and the first PDU session, the AMF first obtains the DNN corresponding to the first PDU session, and then obtains the APN corresponding to the DNN.

S313. The UDM+HSS returns a notify response (Notify Response) message to the AMF.

It should be noted that a sequence of performing step S310 and step S312 is not limited. In addition, steps S312 and S313 are optional. The SMF+PGW-C address corresponding to the DNN may also be included in the subscription data request in step S305, and in this case, steps S312 and S313 do not need to be performed. A function of step S312, step S313, or step S305 is to enable the UDM+HSS to obtain the SMF+PGW-C address corresponding to the established first PDU session.

Figure 9A:
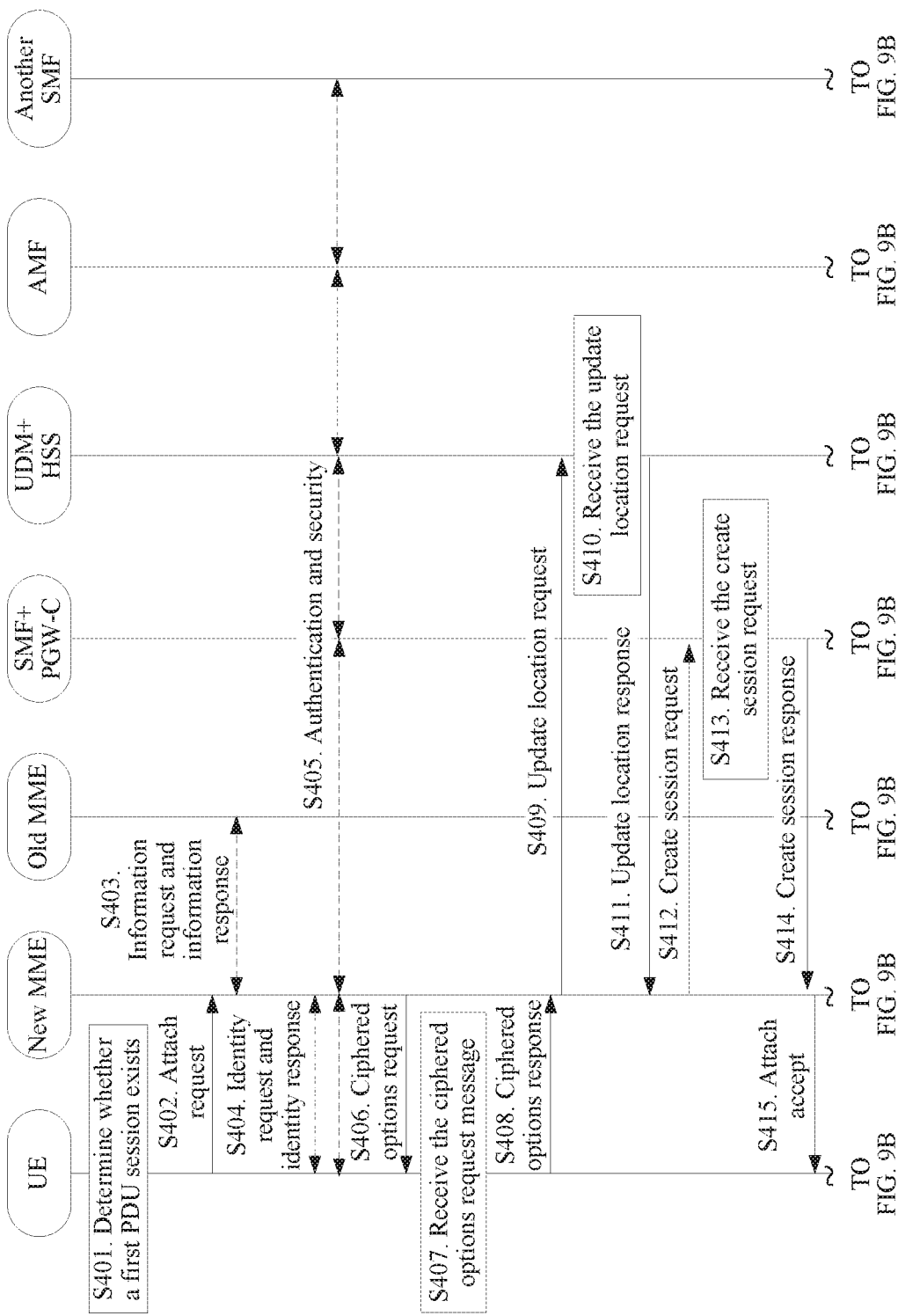
FIG. 9A and FIG. 9B are a schematic flowchart of still another inter-communications-system moving method according to an embodiment of this application.
Figure 9B:
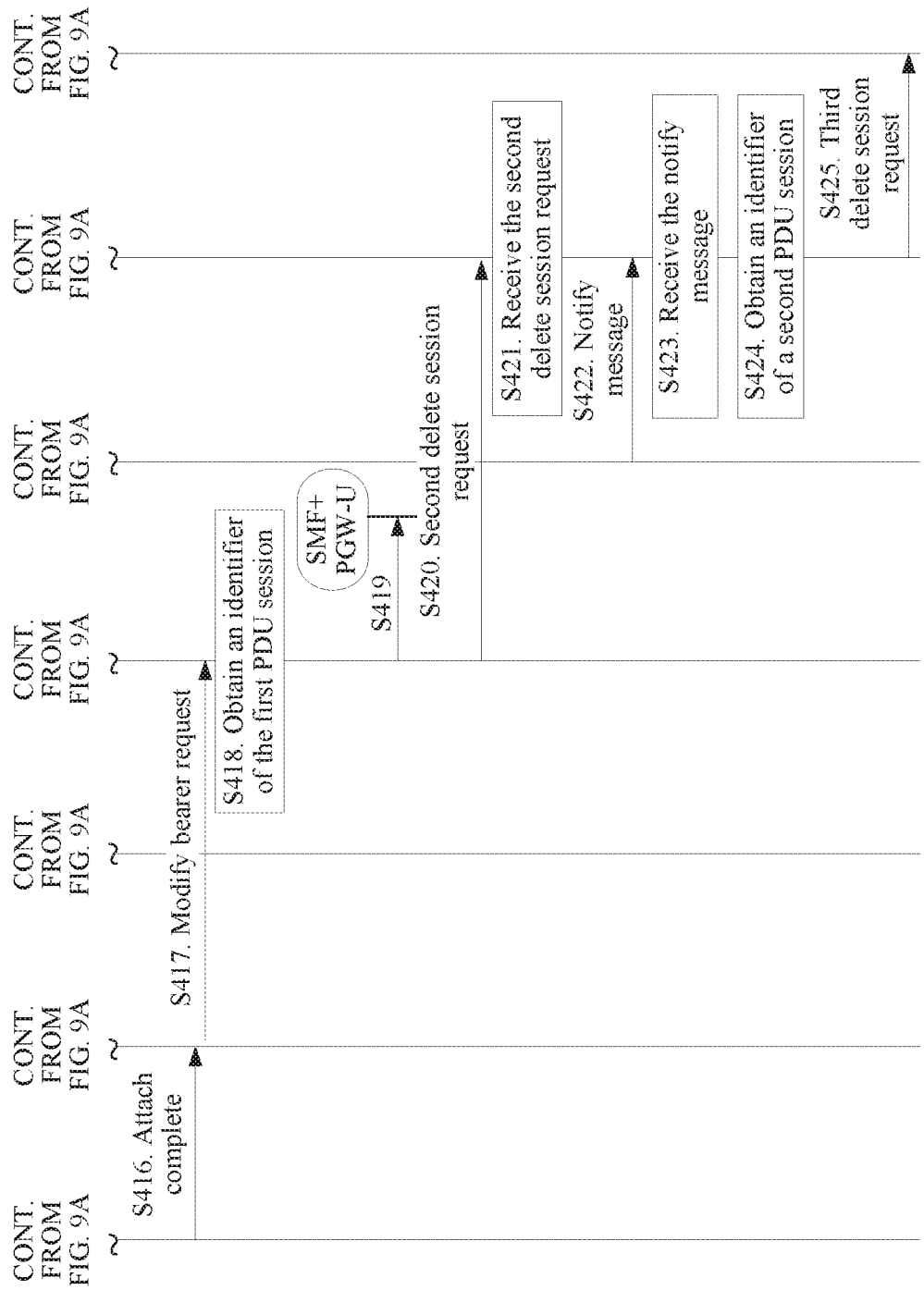

An embodiment of this application provides an inter-communications-system moving method, to improve a procedure of registering UE with a second communications system (for example, 4G) during transfer of a PDU session of the UE in 5G from a first communications system (for example, 5G) to the second communications system (for example, 4G). As shown in FIG. 9A and FIG. 9B, the method includes the following steps.

S401. When the UE needs to move from 5G to 4G, the UE determines whether a first PDU session capable of being transferred from 5G to 4G exists in 5G.

This step corresponds to step S101.

When the UE has a plurality of first PDU sessions capable of being transferred from 5G to 4G in 5G, the UE initiates a request for each first PDU session capable of being transferred from 5G to 4G.

It should be noted that in step S311, the UE can learn whether each PDU session is capable of being transferred from 5G to 4G.

S402. The UE initiates an attach request (Attach Request) message to a new MME when determining that the first PDU session exists in 5G.

This step corresponds to step S102.

The attach request message includes a handover (handover) indication, and therefore the attach request is a handover attach (handover attach) request. The attach request message may further include a ciphered options transfer flag (Ciphered Options Transfer Flag). It should be noted that whether to add the ciphered options transfer flag to the attach request message may be determined by the UE. For example, when the UE determines that an APN corresponding to the first PDU session is not a default APN, or determines that a DNN corresponding to the first PDU session is not a default DNN, the ciphered options transfer flag is added to the attach request message.

It should be noted that when the UE determines that the PDU session capable of being transferred from 5G to 4G does not exist, the UE initiates an attach request including an initial attach (initial attach) indication.

S403. When the new MME (an MME currently serving the UE) is different from an old AMF (an MME serving the UE when the UE performs detach (detach)), the new MME requests context information of the UE from the old MME by using an information request (Information Request) and an information response (Information Response).

S404. When the new MME or the old MME cannot verify validity of the UE, the new MME requests an IMSI of the UE from the UE by using an identity request (Identity Request) and an identity response (Identity Response) between the new MME and the UE.

S405. The new MME verifies the validity of the UE based on the IMSI by using an authentication (Authentication) message and a security (Security) message.

S406. After the new MME verifies that the UE is valid, the new MME sends a ciphered options request (Ciphered Options Transfer Request) message to the UE.

Because the ciphered options transfer flag is carried in step S402, the new MME sends the ciphered options request message to the UE based on the ciphered options transfer flag.

S407. The UE receives the ciphered options request message.

S408. The UE obtains an APN corresponding to the first PDU session, and sends a ciphered options response (Ciphered Options Transfer Response) message to the new MME, where the ciphered options response message includes the APN.

Specifically, there are two methods for obtaining the APN:

Method 1. If the PDU session establishment accept message in step S310 includes an APN, the UE directly uses the APN.

Method 2. If the PDU session establishment accept message in step S310 does not include an APN, the UE obtains an APN corresponding to the first PDU session based on a locally stored DNN-APN correspondence and the DNN corresponding to the first PDU session and by mapping the DNN of the first PDU session to the APN.

S409. The new MME sends an update location request (Update Location Request) to a UDM+HSS, where the update location request includes the identity IMSI of the UE and an identity of the new MME.

Optionally, the update location request may further include indication information indicating whether the UE is to perform dual registration. If the MME determines that the UE is to perform dual registration, the MME adds indication information indicating dual registration to the update location request; otherwise, the MME adds indication information indicating single registration to the update location request, or does not add indication information to the update location request.

S410. The UDM+HSS receives the update location request, and learns, based on the update location request, that the UE has entered the second communications system. That the UE has entered the second communications system may be understood as: The UE is currently in the second communications system, or the UE has performed registration or location update in the second communications system.

S411. The UDM+HSS returns an update location response (Update Location Response) to the new MME, where the update location response includes subscription data of the UE, an APN of the UE, and an SMF+PGW-C address corresponding to the APN.

Specifically, the UDM+HSS obtains an SMF+PGW-C address corresponding to the DNN in step S312, and the UDM+HSS locally stores the DNN-APN correspondence. In this way, the UDM+HSS obtains the SMF+PGW-C address corresponding to the APN, and then sends the SMF+PGW-C address to the MME.

S412. After obtaining the SMF+PGW-C address corresponding to the APN, the new MME sends a create session request message to a corresponding SMF+PGW-C by using an SGW, where the create session request (Create Session Request) message includes a handover indication and the APN corresponding to the first PDU session.

This step corresponds to steps S104 and S105.

The create session request message is used to establish a PDN connection in 4G, and the PDN connection corresponds to the first PDU session in 5G.

S413. The SMF+PGW-C receives the create session request.

S414. The SMF+PGW-C returns a create session response (Create Session Response) message to the new MME by using the SGW.

The SMF+PGW-C may obtain, based on the APN in the create session request message in step S412, a DNN corresponding to the APN, and obtain a corresponding IP address of the first PDU session based on the DNN; or the SMF+PGW-C may directly obtain a corresponding IP address of the first PDU session based on the APN. Optionally, the SMF+PGW-C may obtain a PDU session identifier (PDU session ID) of the first PDU session based on the IP address. Optionally, the create session response message includes the IP address.

S415. The new MME sends an attach accept (Attach Accept) message to the UE.

S416. The UE sends an attach complete (Attach Complete) message to the new MME.

S417. The new MME sends a modify bearer request (Modify Bearer Request) message to the SMF+PGW-C by using the SGW.

The SMF+PGW-C learns that the UE has transferred the first PDU session from 5G to 4G.

S418. The SMF+PGW-C obtains a PDU session identifier (PDU session ID) corresponding to the first PDU session.

Specifically, there are two methods for obtaining the PDU session identifier corresponding to the first PDU session:

Method 1. If the SMF+PGW-C has obtained the PDU session identifier of the first PDU session in step S414, the SMF+PGW-C directly uses the PDU session identifier.

Method 2. If the SMF+PGW-C has not obtained the PDU session identifier of the first PDU session in step S414, the SMF+PGW-C obtains the PDU session identifier of the first PDU session based on the IP address of the first PDU session obtained in step S414.

S419. The SMF+PGW-C sends a first delete session request (Delete Session Request) to a UPF+PGW-U, where the first delete session request includes the identifier of the first PDU session obtained in step S418.

The first delete session request is used to request the UPF+PGW-U to delete data of the first PDU session on a user plane.

S420. The SMF+PGW-C sends a second delete session request (Delete Session Request) to an AMF corresponding to the UE, where the second delete session request includes the identifier of the first PDU session obtained in step S415.

The first delete session request is used to request the AMF to delete data of the first PDU session, and specifically, request the AMF to locally delete a correspondence between the identifier of the first PDU session and a corresponding SMF+PGW-C.

After receiving the second delete session request, the AMF deletes the first PDU session based on the identifier of the first PDU session.

S421. The AMF receives the second delete session request.

S422. The UDM+HSS sends a notify message to the AMF based on that the UE has performed dual registration, to notify the AMF that the UE has moved from the first communications system (for example, 5G) to the second communications system (for example, 4G) (that is, the UE is in 4G currently).

Specifically, a manner in which the UDM+HSS learns that the UE has performed dual registration includes:

Method 1. In step S211, the UDM+HSS learns that the UE has performed dual registration.

Method 2. The UDM+HSS learns, from the update location request in step S410, that the UE has performed dual registration.

S423. After receiving the notify message, the AMF may determine, based on the message, that the UE is currently in the second communications system.

S424. The AMF obtains an identifier of a second PDU session based on locally stored information about all PDU sessions.

Corresponding to step S110, step S420 and step S424 disclose an approach of obtaining the identifier of the first PDU session and the identifier of the second PDU session by the AMF.

S425. The AMF sends a third delete session request (Delete Session Request) to an SMF corresponding to the second PDU session, to initiate a procedure of deleting the second PDU session.

Specifically, the third delete session request is used by the SMF to delete the second PDU session corresponding to the identifier of the second PDU session. The third delete session request includes the identifier of the second PDU session.

After receiving the third delete session request, the SMF deletes the second PDU session based on the identifier of the second PDU session.

Figure 10A:
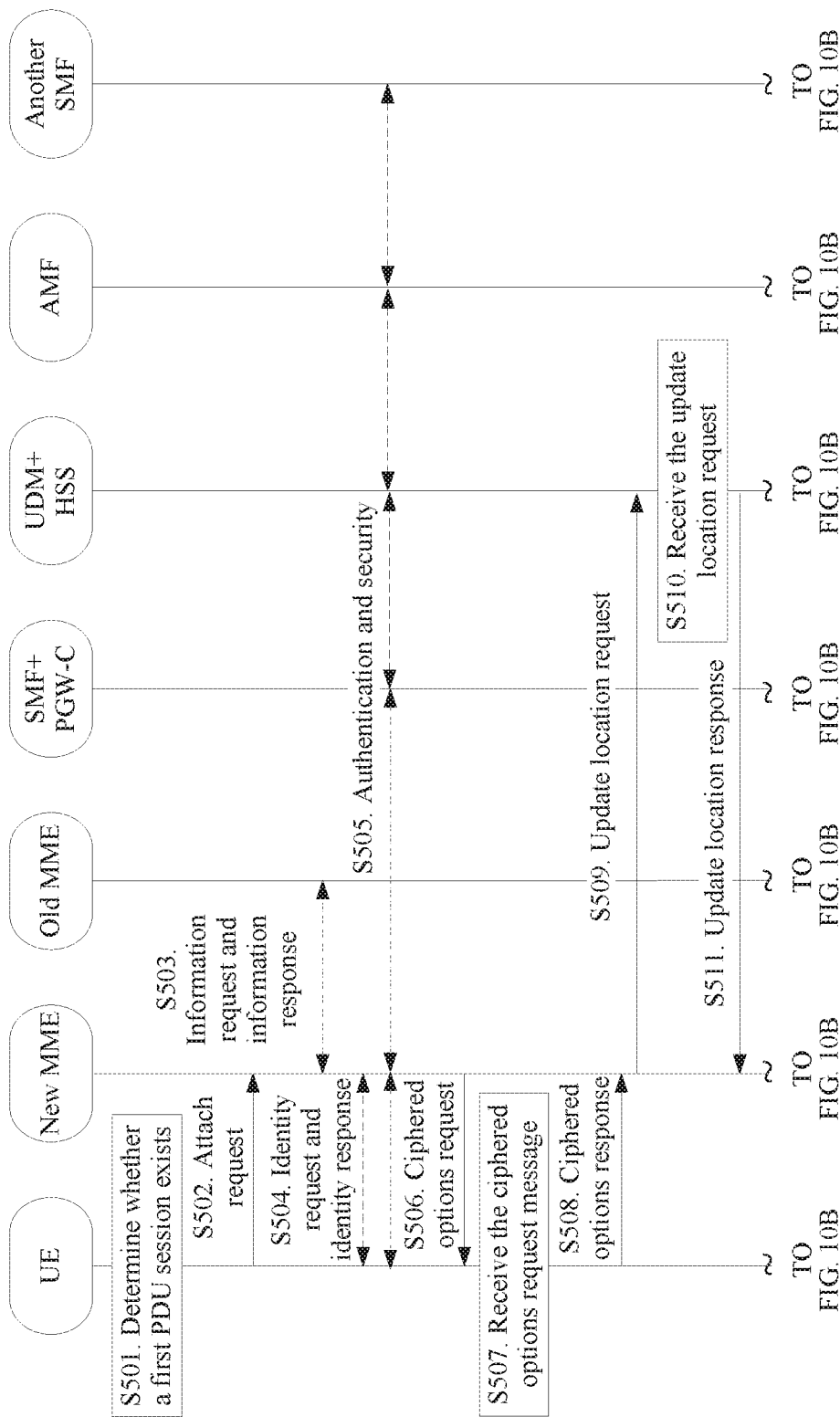
FIG. 10A and FIG. 10B are a schematic flowchart of yet another inter-communications-system moving method according to an embodiment of this application.
Figure 10B:
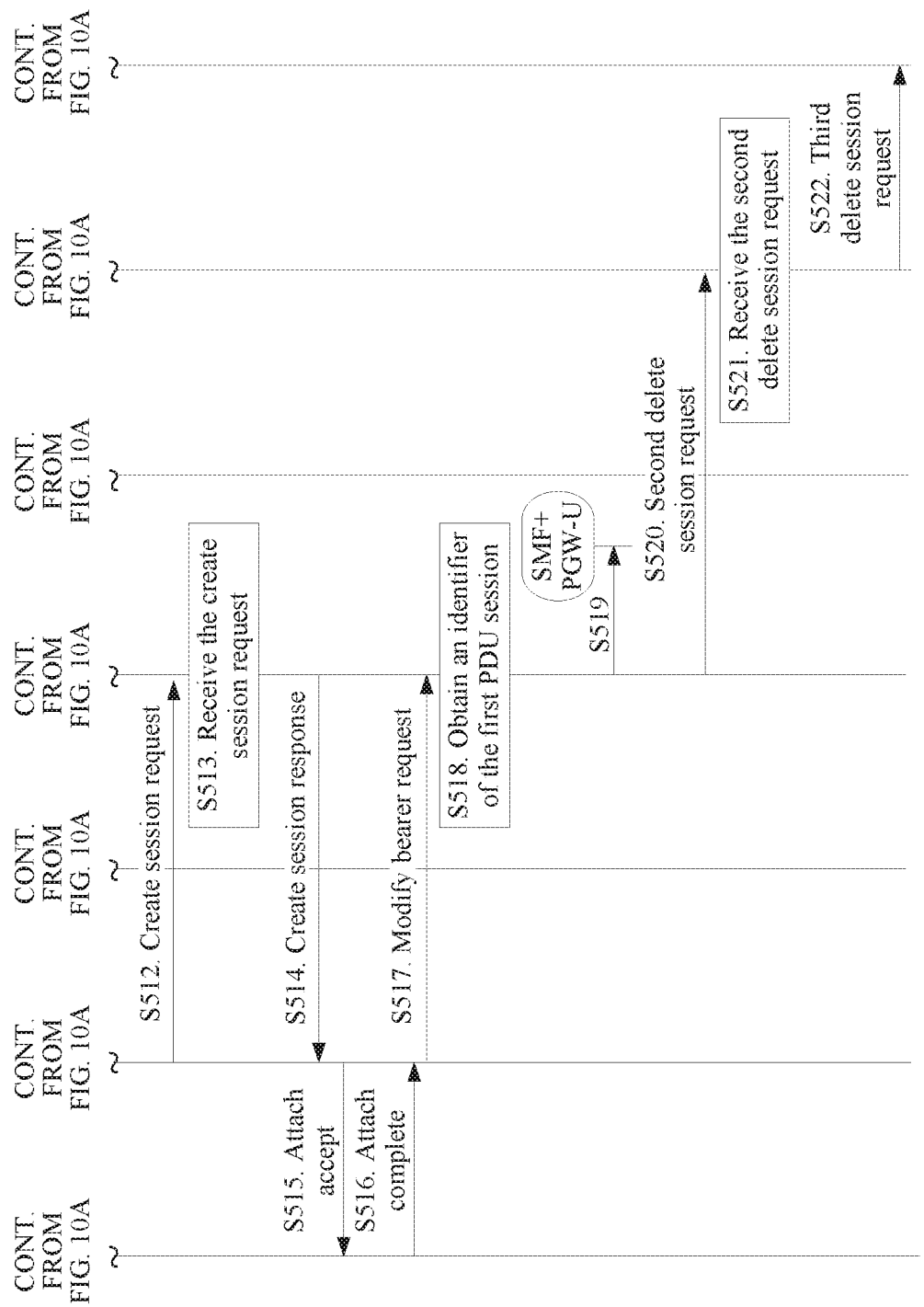

An embodiment of this application provides another inter-communications-system moving method, to improve a procedure of registering UE with 4G during seamless transfer of a PDU session of UE in 5G from 5G to 4G Referring to FIG. 10A and FIG. 10B, the method includes the following steps.

S501 to S507 are the same as steps S401 to S407 in FIG. 9A. Details are not described herein again.

S508. Different from step S408 in FIG. 9A, the ciphered options response message may further include an identifier of a second PDU session.

Specifically, the ciphered options response message includes a protocol configuration option (Protocol Configuration Option, PCO), and the PCO includes the identifier of the second PDU session.

S509 to S511 are the same as steps S409 to S411 in FIG. 9A. Details are not described herein again.

S512. Different from step S412 in FIG. 9A, the create session request message may further include the identifier of the second PDU session.

Specifically, the create session request message includes the PCO, and the PCO includes the identifier of the second PDU session.

S513 to S519 are the same as steps S413 to S419 in FIG. 9A and FIG. 9B. Details are not described herein again.

S520. Different from step S420 in FIG. 9B, the second delete session request further includes the identifier of the second PDU session, to request the AMF to delete the second PDU session.

Corresponding to step S110, step S520 discloses another approach of obtaining the identifier of the first PDU session and the identifier of the second PDU session by the AMF.

It should be noted that the identifier of the second PDU session may alternatively be carried in a separate message.

S521 is the same as step S421 in FIG. 9B, and S522 is the same as step S425 in FIG. 9B. Details are not described herein again.

It should be noted that in steps S401 and S501, if it is the first time that the UE registers with 4G, one first PDU session may be seamlessly transferred from 5G to 4G by using steps S401 and S501. After the UE completes registration with 4G, the UE may move, to 4G by sending a PDN connectivity request (PDN Connectivity Request) to an MME, another first PDU session capable of being seamlessly transferred from 5G to 4G The PDN connectivity request includes a handover indication and the APN corresponding to the first PDU session. Optionally, whether to add the APN corresponding to the first PDU session to the PDN connectivity request may be determined by the UE, or the APN corresponding to the first PDU session may be directly carried in the PDN connectivity request. For example, when the UE determines that the APN corresponding to the first PDU session is not a default APN, or determines that the DNN corresponding to the first PDU session is not a default DNN, the APN corresponding to the first PDU session is added to the PDN connectivity request.

An embodiment of this application provides UE, to perform the foregoing inter-communications-system moving methods. In this embodiment of this application, function module division for the UE may be based on the foregoing method examples. For example, division of function modules may be based on various functions, or two or more functions may be integrated into one processing module. The integrated module may be implemented in a form of hardware, or may be implemented in a form of a software function module. It should be noted that the module division in this embodiment of this application is an example, and is merely logical function division and may be other division in actual implementation.

Figure 11:
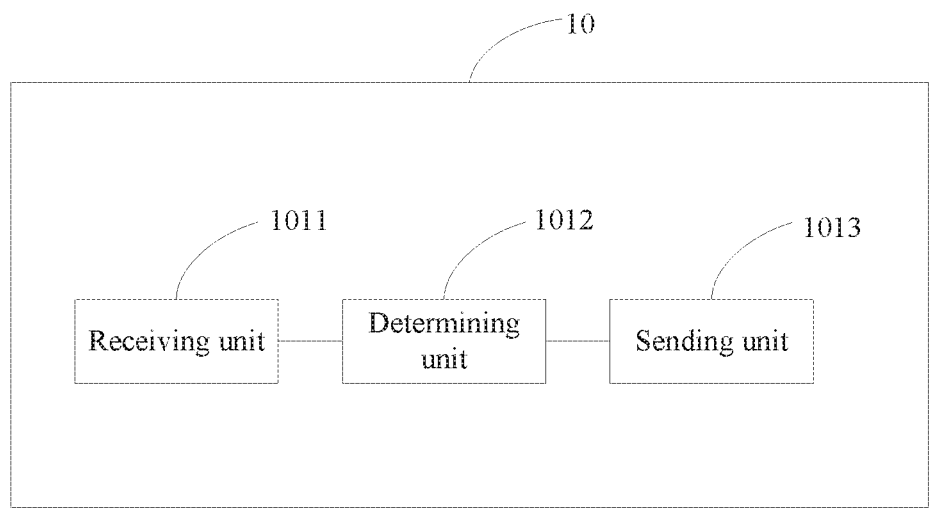
FIG. 11 is a schematic structural diagram of UE according to an embodiment of this application.

FIG. 11 is a possible schematic structural diagram of the UE described in the foregoing embodiment when division of function modules is based on various functions. UE 10 includes a receiving unit 1011, a determining unit 1012, and a sending unit 1013. The receiving unit 1011 is configured to support the UE 10 in performing the process S113 in FIG. 4A, the process S311 in FIG. 8, the process S407 in FIG. 9A, and the process S507 in FIG. 10A. The determining unit 1012 is configured to support the UE 10 in performing the process S101 in FIG. 3 and the process S401 in FIG. 9A. The sending unit 1013 is configured to support the UE 10 in performing the process S102 in FIG. 3, the process S102 in FIG. 4A, the processes S201 and S210 in FIG. 5, the processes S201 and S210 in FIG. 6, the process S301 in FIG. 7, the process S301 in FIG. 8, the processes S401, S408, and S416 in FIG. 9B, and the processes S501, S508, and S516 in FIG. 10. All the related content of various steps described in the foregoing method embodiments may be applied to the function descriptions of corresponding function modules. Details are not described herein again.

Figure 12:
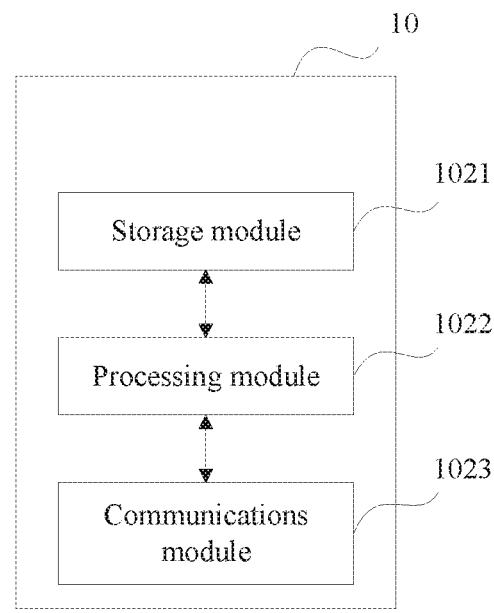
FIG. 12 is a schematic structural diagram of another UE according to an embodiment of this application.

FIG. 12 is a possible schematic structural diagram of the UE described in the foregoing embodiment when units are integrated. UE 10 includes a processing module 1022 and a communications module 1023. The processing module 1022 is configured to control and manage actions of the UE 10. For example, the processing module 1022 is configured to support the UE 10 in performing the process S101 in FIG. 3 and the process S401 in FIG. 9A. The communications module 1023 is configured to support communication between the UE and another entity, for example, communication between the UE and the function module or the network entity in FIG. 1. The UE 10 may further include a storage module 1021, configured to store program code and data of the UE.

The processing module 1022 may be a processor or a controller. For example, the processing module 1022 may be a central processing unit (Central Processing Unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processing module 1022 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 1023 may be a transceiver, a transceiver circuit, a communications interface, or the like. The storage module 1021 may be a memory.

When the processing module 1022 is a processor, the communications module 1023 is a transceiver, and the storage module 1021 is a memory, the UE described in this embodiment of this application may be the following UE 10.

Figure 13:
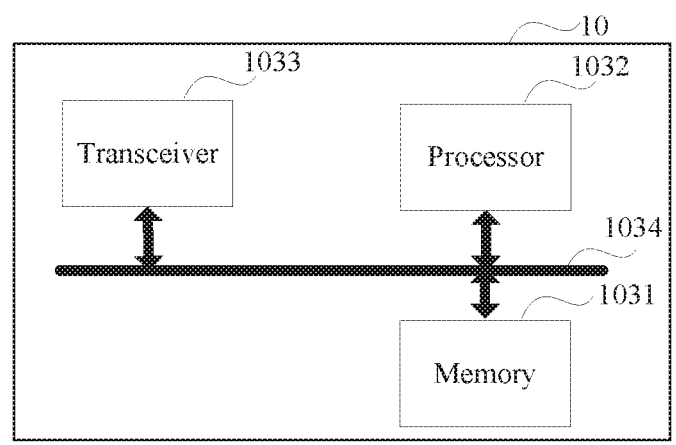
FIG. 13 is a schematic structural diagram of still another UE according to an embodiment of this application.

Referring to FIG. 13, the UE 10 includes a processor 1032, a transceiver 1033, a memory 1031, and a bus 1034. The transceiver 1033, the processor 1032, and the memory 1031 are connected to each other by using the bus 1034. The bus 1034 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in the figure, but this does not mean that there is only one bus or only one type of bus.

An embodiment of this application provides a second core network device, to perform the foregoing inter-communications-system moving methods. In this embodiment of this application, function module division for the second core network device may be based on the foregoing method examples. For example, division of function modules may be based on various functions, or two or more functions may be integrated into one processing module. The integrated module may be implemented in a form of hardware, or may be implemented in a form of a software function module. It should be noted that the module division in this embodiment of this application is an example, and is merely logical function division and may be other division in actual implementation.

Figure 14:
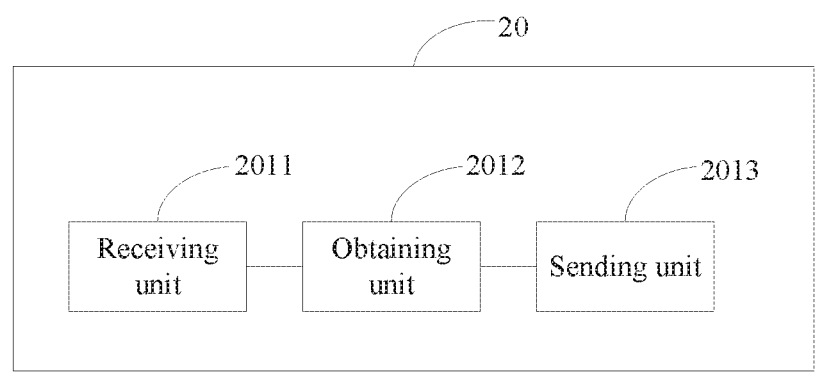
FIG. 14 is a schematic structural diagram of a second core network device according to an embodiment of this application.

FIG. 14 is a possible schematic structural diagram of the second core network device described in the foregoing embodiment when division of function modules is based on various functions. A second core network device 20 includes a receiving unit 2011, an obtaining unit 2012, and a sending unit 2013. The receiving unit 2011 is configured to support the second core network device 20 in performing the process S106 in FIG. 3, the process S106 in FIG. 4A, the process S413 in FIG. 9A, and the process S513 in FIG. 10B. The obtaining unit 2012 is configured to support the second core network device 20 in performing the process S107 in FIG. 3, the process S107 in FIG. 4A, the process S418 in FIG. 9B, and the process S518 in FIG. 10B. The sending unit 2013 is configured to support the second core network device 20 in performing the process S108 in FIG. 3, the process S108 in FIG. 4B, the processes S305 and S309 in FIG. 7, the processes S305 and S309 in FIG. 8, the processes S419 and S420 in FIG. 9B, and the processes S519 and S520 in FIG. 10B. All the related content of various steps described in the foregoing method embodiments may be applied to the function descriptions of corresponding function modules. Details are not described herein again.

Figure 15:
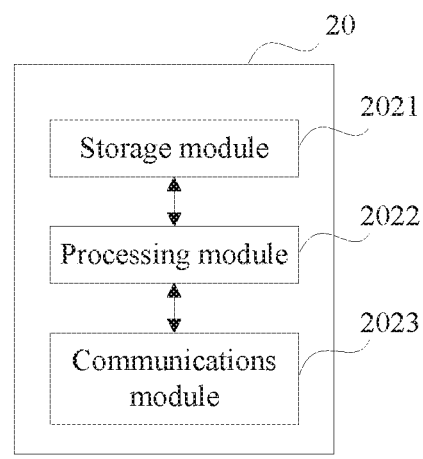
FIG. 15 is a schematic structural diagram of another second core network device according to an embodiment of this application.

FIG. 15 is a possible schematic structural diagram of the core network device described in the foregoing embodiment when units are integrated. A second core network device 20 includes a processing module 2022 and a communications module 2023. The processing module 2022 is configured to control and manage actions of the second core network device 20. For example, the processing module 2022 is configured to support the second core network device 20 in performing the process S107 in FIG. 3, the process S108 in FIG. 4B, the process S418 in FIG. 9B, and the process S518 in FIG. 10B. The communications module 2023 is configured to support communication between the core network device and another entity, for example, communication between the core network device and the function module or the network entity in FIG. 1. The second core network device 20 may further include a storage module 2021, configured to store program code and data of the core network device.

The processing module 2022 may be a processor or a controller. For example, the processing module 2022 may be a central processing unit (Central Processing Unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processing module 2022 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 2023 may be a transceiver, a transceiver circuit, a communications interface, or the like. The storage module 2021 may be a memory.

When the processing module 2022 is a processor, the communications module 2023 is a transceiver, and the storage module 2021 is a memory, the core network device described in this embodiment of this application may be the following core network device.

Figure 16:
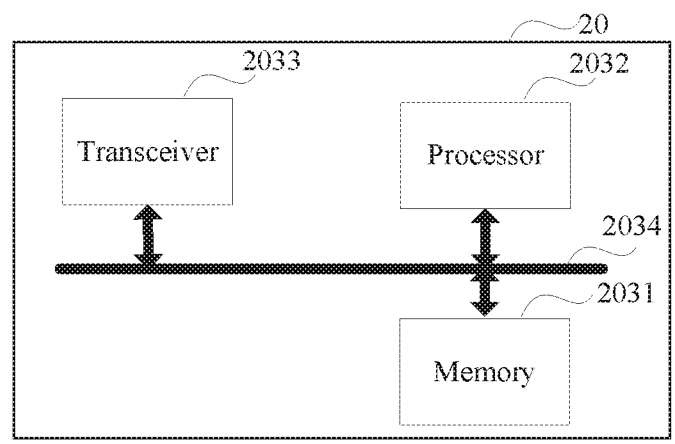
FIG. 16 is a schematic structural diagram of still another second core network device according to an embodiment of this application.

Referring to FIG. 16, the second core network device 20 includes a processor 2032, a transceiver 2033, a memory 2031, and a bus 2034. The transceiver 2033, the processor 2032, and the memory 2031 are connected to each other by using the bus 2034. The bus 2034 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in the figure, but this does not mean that there is only one bus or only one type of bus.

An embodiment of this application provides a third core network device, to perform the foregoing inter-communications-system moving methods. In this embodiment of this application, function module division for the core network device may be based on the foregoing method examples. For example, division of function modules may be based on various functions, or two or more functions may be integrated into one processing module. The integrated module may be implemented in a form of hardware, or may be implemented in a form of a software function module. It should be noted that the module division in this embodiment of this application is an example, and is merely logical function division and may be other division in actual implementation.

Figure 17:
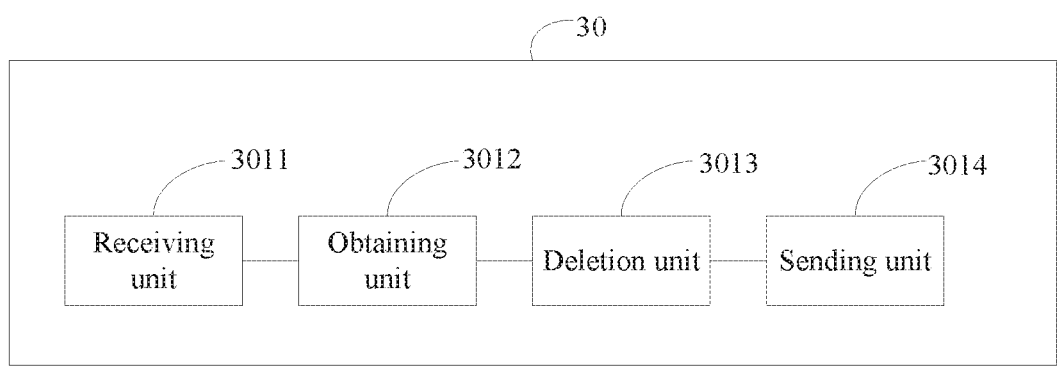
FIG. 17 is a schematic structural diagram of a third core network device according to an embodiment of this application.

FIG. 17 is a possible schematic structural diagram of the core network device described in the foregoing embodiment when division of function modules is based on various functions. A third core network device 30 includes a receiving unit 3011, an obtaining unit 3012, a deletion unit 3013, and a sending unit 3014. The receiving unit 3011 is configured to support the third core network device 30 in performing the process S109 in FIG. 3, the process S109 in FIG. 4B, the process S302 in FIG. 7, the process S302 in FIG. 8, the processes S421 and S423 in FIG. 9B, and the process S521 in FIG. 10B. The obtaining unit 3012 is configured to support the third core network device 30 in performing the process S110 in FIG. 3, the process S110 in FIG. 4B, the process S208 in FIG. 5, the process S208 in FIG. 6, the process S303 in FIG. 7, the process S303 in FIG. 8, and the process S424 in FIG. 9B. The deletion unit 3013 is configured to support the third core network device 30 in performing the process S111 in FIG. 3 and the process S111 in FIG. 4B. The sending unit 3014 is configured to support the third core network device 30 in performing the process S112 in FIG. 3, the process S112 in FIG. 4B, the processes S205 and S209 in FIG. 5, the processes S205, S209, and S211 in FIG. 6, the processes S304 and S310 in FIG. 7, the processes S304, S310, and S312 in FIG. 8, the process S425 in FIG. 9B, and the process S522 in FIG. 10B. All the related content of various steps described in the foregoing method embodiments may be applied to the function descriptions of corresponding function modules. Details are not described herein again.

Figure 18:
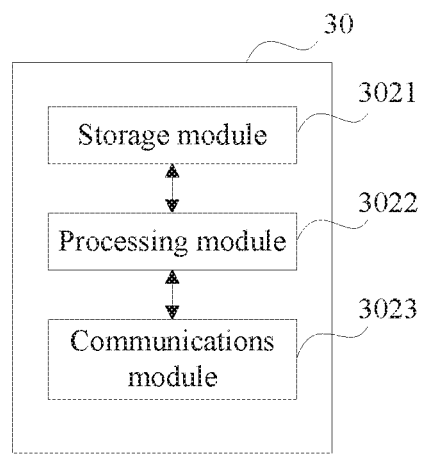
FIG. 18 is a schematic structural diagram of another third core network device according to an embodiment of this application.

FIG. 18 is a possible schematic structural diagram of the core network device described in the foregoing embodiment when units are integrated. A third core network device 30 includes a processing module 3022 and a communications module 3023. The processing module 3022 is configured to control and manage actions of the third core network device 30. For example, the processing module 3022 is configured to support the third core network device 30 in performing the processes S110 and S111 in FIG. 3, the processes S110 and S111 in FIG. 4B, the process S208 in FIG. 5, the process S208 in FIG. 6, the process S303 in FIG. 7, the process S303 in FIG. 8, and the process S424 in FIG. 9B. The communications module 3023 is configured to support communication between the core network device and another entity, for example, communication between the core network device and the function module or the network entity in FIG. 1. The third core network device 30 may further include a storage module 3021, configured to store program code and data of the core network device.

The processing module 3022 may be a processor or a controller. For example, the processing module 3022 may be a central processing unit (Central Processing Unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processing module 3022 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 3023 may be a transceiver, a transceiver circuit, a communications interface, or the like. The storage module 3021 may be a memory.

When the processing module 3022 is a processor, the communications module 3023 is a transceiver, and the storage module 3021 is a memory, the core network device described in this embodiment of this application may be the following third core network device.

Figure 19:
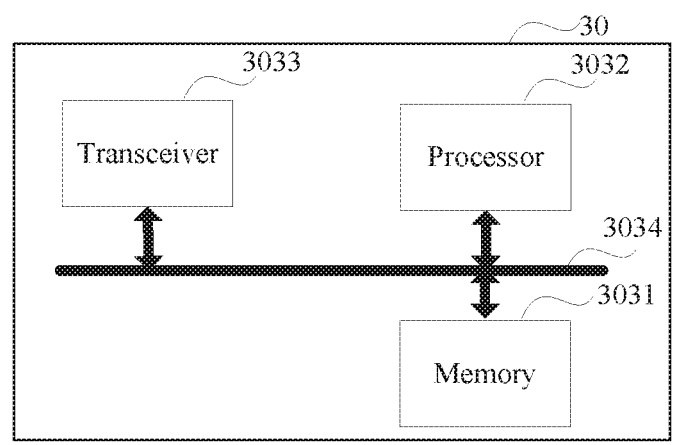
FIG. 19 is a schematic structural diagram of still another third core network device according to an embodiment of this application.

Referring to FIG. 19, the third core network device 30 includes a processor 3032, a transceiver 3033, a memory 3031, and a bus 3034. The transceiver 3033, the processor 3032, and the memory 3031 are connected to each other by using the bus 3034. The bus 3034 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in the figure, but this does not mean that there is only one bus or only one type of bus.

An embodiment of this application provides a fifth core network device, to perform the foregoing inter-communications-system moving methods. In this embodiment of this application, function module division for the core network device may be based on the foregoing method examples. For example, division of function modules may be based on various functions, or two or more functions may be integrated into one processing module. The integrated module may be implemented in a form of hardware, or may be implemented in a form of a software function module. It should be noted that the module division in this embodiment of this application is an example, and is merely logical function division and may be other division in actual implementation.

Figure 20:
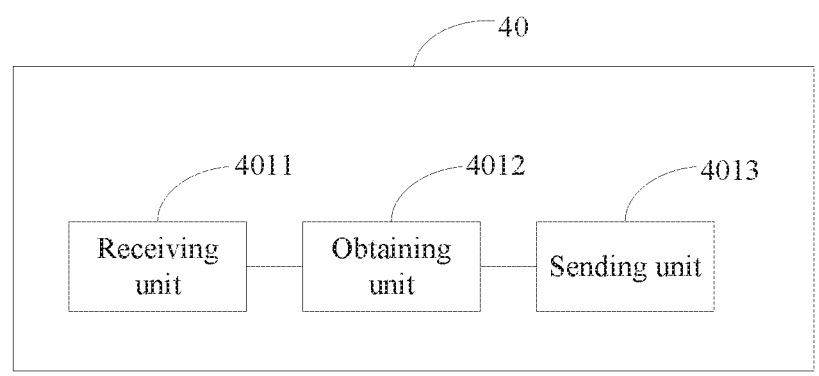
FIG. 20 is a schematic structural diagram of a fifth core network device according to an embodiment of this application.

FIG. 20 is a possible schematic structural diagram of the core network device described in the foregoing embodiment when division of function modules is based on various functions. A fifth core network device 40 includes a receiving unit 4011, an obtaining unit 4012, and a sending unit 4013. The receiving unit 4011 is configured to support the fifth core network device 40 in performing the process S115 in FIG. 4B, the process S212 in FIG. 6, the process S410 in FIG. 9A, and the process S510 in FIG. 10A. The obtaining unit 4012 is configured to support the fifth core network device 40 in performing the processes S114 and S115 in FIG. 4B. The sending unit 4013 is configured to support the fifth core network device 40 in performing the process S206 in FIG. 5, the processes S206 and S213 in FIG. 6, and the process S306 in FIG. 7, the processes S306 and S313 in FIG. 8, the processes S411 and S422 in FIG. 9A and FIG. 9B, and the process S511 in FIG. 10A. All the related content of various steps described in the foregoing method embodiments may be applied to the function descriptions of corresponding function modules. Details are not described herein again.

Figure 21:
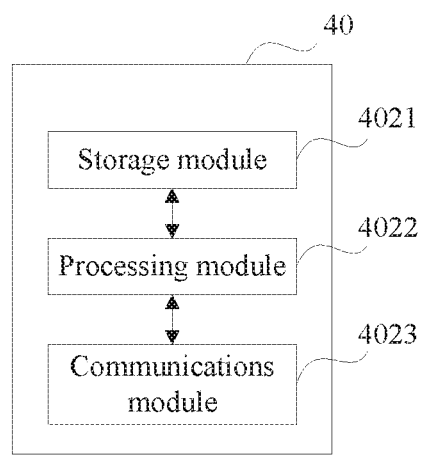
FIG. 21 is a schematic structural diagram of another fifth core network device according to an embodiment of this application.

FIG. 21 is a possible schematic structural diagram of the core network device described in the foregoing embodiment when units are integrated. A fifth core network device 40 includes a processing module 4022 and a communications module 4023. The processing module 4022 is configured to control and manage actions of the fifth core network device 40. For example, the processing module 4022 is configured to support the fifth core network device 40 in performing the processes S114 and S115 in FIG. 4B. The communications module 4023 is configured to support communication between the core network device and another entity, for example, communication between the core network device and the function module or the network entity in FIG. 1. The fifth core network device 40 may further include a storage module 4021, configured to store program code and data of the core network device.

The processing module 4022 may be a processor or a controller. For example, the processing module 4022 may be a central processing unit (Central Processing Unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processing module 4022 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 4023 may be a transceiver, a transceiver circuit, a communications interface, or the like. The storage module 4021 may be a memory.

When the processing module 4022 is a processor, the communications module 4023 is a transceiver, and the storage module 4021 is a memory, the core network device described in this embodiment of this application may be the following fifth core network device.

Figure 22:
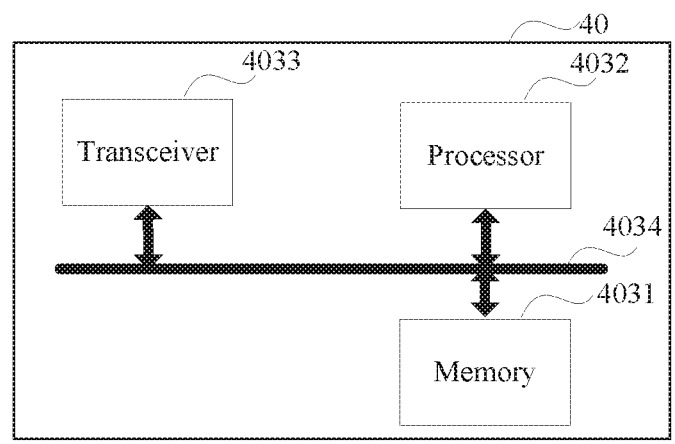
FIG. 22 is a schematic structural diagram of still another fifth core network device according to an embodiment of this application.

Referring to FIG. 22, the fifth core network device 40 includes a processor 4032, a transceiver 4033, a memory 4031, and a bus 4034. The transceiver 4033, the processor 4032, and the memory 4031 are connected to each other by using the bus 4034. The bus 4034 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in the figure, but this does not mean that there is only one bus or only one type of bus.

All or some of the foregoing embodiments may be implemented by using software, hardware, firmware, or any combination thereof. When a software program is used to implement the embodiments, some or all of the embodiments may be implemented in a form of a computer program product. The computer program product includes one or more computer instructions. When the computer program instructions are loaded and executed on a computer, the procedure or functions described in the embodiments of this application are all or partially generated. The computer may be a general-purpose computer, a dedicated computer, a computer network, or other programmable apparatuses. The computer instruction may be stored in a computer readable storage medium, or may be transmitted from a computer readable storage medium to another computer readable storage medium. For example, the computer instruction may be transmitted from a website, a computer, a server, or a data center to another website, another computer, another server, or another data center in a wired (for example, a coaxial cable, an optical fiber, or a digital subscriber line (Digital Subscriber Line, DSL)) or wireless (for example, infrared, radio, or microwave) manner. The computer readable storage medium may be any usable medium accessible by a computer, or a data storage device, such as a server or a data center, including one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

Therefore, the protection scope of this application shall be subject to the protection scope of the claims.

What is claimed is:

1. A method, implemented by user equipment (UE), comprising:

receiving at least one of a quality of service (QoS) parameter of a second communications system or a bearer identifier of the second communications system during a process of establishing a protocol data unit (PDU) session in a first communications system, wherein the at least one of the QoS parameter of the second communications system or the bearer identifier of the second communications system corresponds to the PDU session;

when the UE moves from the first communications system to the second communications system, determining, based on the at least one of the QoS parameter of the second communications system or the bearer identifier of the second communications system, that the PDU session is capable of being transferred from the first communications system to the second communications system; and performing, in response to the determination, a tracking area update in the second communications system.

2. The method of claim 1, further comprising:

determining that there is no PDU session that is capable of being transferred from the first communications system to the second communications system; and performing, in response to determining that there is no PDU session that is capable of being transferred from the first communications system to the second communications system, an initial attach in the second communications system.

3. The method of claim 1, wherein receiving the at least one of the QoS parameter of the second communications system or the bearer identifier of the second communications system during the process of establishing the PDU session in the first communications system comprises:

sending a PDU session establishment request message to a core network device of the first communications system to establish the PDU session; and receiving a PDU session establishment accept message from the core network device, wherein the PDU session establishment accept message comprises the at least one of the QoS parameter of the second communications system or the bearer identifier of the second communications system.

4. The method of claim 2, wherein performing, in response to determining that there is no PDU session that is capable of being transferred from the first communications system to the second communications system, the initial attach in the second communications system comprises performing, in response to determining that there is no PDU session that is capable of being transferred from the first communications system to the second communications system and the UE or the second communications system does not support attaching to the second communications system without Protocol Data Network (PDN) connectivity, an initial attach in the second communications system.

5. The method of claim 1, further comprising communicating, via a PDN connection, with the second communications system, wherein the PDN connection corresponds to the PDU session, and wherein the PDU session and the PDN connection have a same Internet Protocol (IP) address.

6. The method of claim 1, wherein the first communications system is a fifth generation (5G) communications system, and wherein the second communications system is a fourth generation (4G) communications system.

7. The method of claim 5, wherein the PDU session and the PDN connection have a same session management apparatus and a same user plane apparatus.

8. An apparatus, comprising:

at least one processor; and a memory coupled to the at least one processor, wherein the memory comprises instructions that, when executed by the at least one processor, cause the apparatus to:

receive at least one of a quality of service (QoS) parameter of a second communications system or a bearer identifier of the second communications system during a process of establishing a protocol data unit (PDU) session in a first communications system, wherein the at least one of the QoS parameter of the second communications system or the bearer identifier of the second communications system corresponds to the PDU session;

when the apparatus moves from the first communications system to the second communications system, determine, based on the at least one of the QoS parameter of the second communications system or the bearer identifier of the second communications system, that the PDU session is capable of being transferred from the first communications system to the second communications system; and perform, in response to the determination, a tracking area update in the second communications system.

9. The apparatus of claim 8, wherein the memory further comprises instructions that, when executed by the at least one processor, cause the apparatus to:

determine that there is no PDU session that is capable of being transferred from the first communications system to the second communications system; and perform, in response to determining that there is no PDU session that is capable of being transferred from the first communications system to the second communications system, an initial attach in the second communications system.

10. The apparatus of claim 8, wherein receiving the at least one of the QoS parameter of the second communications system or the bearer identifier of the second communications system during the process of establishing the PDU session in the first communications system comprises:

sending a PDU session establishment request message to a core network device of the first communications system to establish the PDU session; and receiving a PDU session establishment accept message from the core network device, wherein the PDU session establishment accept message comprises the at least one of the QoS parameter of the second communications system or the bearer identifier of the second communications system.

11. The apparatus of claim 9, wherein performing, in response to determining that there is no PDU session that is capable of being transferred from the first communications system to the second communications system, the initial attach in the second communications system comprises performing, in response to determining that there is no PDU session that is capable of being transferred from the first communications system to the second communications system and the apparatus or the second communications system does not support attaching to the second communications system without Protocol Data Network (PDN) connectivity, an initial attach in the second communications system.

12. The apparatus of claim 8, wherein the memory further comprises instructions that, when executed by the at least one processor, cause the apparatus to communicate, via a PDN connection, with the second communications system, wherein the PDN connection corresponds to the PDU session, and wherein the PDU session and the PDN connection have a same Internet Protocol (IP) address.

13. The apparatus of claim 8, wherein the first communications system is a fifth generation (5G) communications system, and wherein the second communications system is a fourth generation (4G) communications system.

14. The apparatus of claim 12, wherein the PDU session and the PDN connection have a same session management apparatus and a same user plane apparatus.

15. A computer program product comprising instructions stored on a non-transitory computer-readable medium that, when executed by a processor, cause an apparatus to:

receive at least one of a quality of service (QoS) parameter of a second communications system or a bearer identifier of the second communications system during a process of establishing a protocol data unit (PDU) session in a first communications system, wherein the at least one of the QoS parameter of the second communications system or the bearer identifier of the second communications system corresponds to the PDU session;

when the apparatus moves from the first communications system to the second communications system, determine, based on the at least one of the QoS parameter of the second communications system or the bearer identifier of the second communications system, that the PDU session is capable of being transferred from the first communications system to the second communications system; and perform, in response to the determination, a tracking area update in the second communications system.

16. The computer program product of claim 15, wherein the instructions further cause the apparatus to:
determine that there is no PDU session that is capable of being transferred from the first communications system to the second communications system; and
perform, in response to determining that there is no PDU session that is capable of being transferred from the first communications system to the second communications system, an initial attach in the second communications system.

17. The computer program product of claim 15, wherein the instructions cause the apparatus to receive the at least one of the QoS parameter of the second communications system or the bearer identifier of the second communications system during the process of establishing the PDU session in the first communications system by:

sending a PDU session establishment request message to a core network device of the first communications system to establish the PDU session; and
receiving a PDU session establishment accept message from the core network device, wherein the PDU session establishment accept message comprises the at least one of the QoS parameter of the second communications system or the bearer identifier of the second communications system.

18. The computer program product of claim 16, wherein the instructions cause the apparatus to perform, in response to determining that there is no PDU session that is capable of being transferred from the first communications system to the second communications system, the initial attach in the second communications system by performing, in response to determining that there is no PDU session that is capable of being transferred from the first communications system to the second communications system and the apparatus or the second communications system does not support attaching to the second communications system without Protocol Data Network (PDN) connectivity, an initial attach in the second communications system.

19. The computer program product of claim 15, wherein the instructions further cause the apparatus to communicate, via a PDN connection, with the second communications system, wherein the PDN connection corresponds to the PDU session, and wherein the PDU session and the PDN connection have a same Internet Protocol (IP) address.

20. The computer program product of claim 15, wherein the first communications system is a fifth generation (5G) communications system, and wherein the second communications system is a fourth generation (4G) communications system.

* * * * *

UNITED STATES PATENT AND TRADEMARK OFFICE
CERTIFICATE OF CORRECTION

PATENT NO. : 11,039,345 B2
APPLICATION NO. : 16/495659
DATED : June 15, 2021
INVENTOR(S) : Hui Jin et al.

Page 1 of 1

It is certified that error appears in the above-identified patent and that said Letters Patent is hereby corrected as shown below:

On the Title Page

Page 2, Column 2 Line 24, References Cited, Other Publications: "3GPP TS 23502 V0.2.0" should read "3GPP TS 23.502 V0.2.0"

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*